United States Patent
Ridley et al.

(10) Patent No.: US 12,389,964 B2
(45) Date of Patent: Aug. 19, 2025

(54) THERMALLY ADAPTIVE FABRICS AND METHODS OF MAKING SAME

(71) Applicant: Other Lab, LLC, San Francisco, CA (US)

(72) Inventors: Brent Ridley, Huntington Beach, CA (US); Jean Chang, San Francisco, CA (US); Leah Bryson, Oakland, CA (US)

(73) Assignee: OTHER LAB, LLC, San Francisco, CA (US)

( * ) Notice: Subject to any disclaimer, the term of this patent is extended or adjusted under 35 U.S.C. 154(b) by 117 days.

(21) Appl. No.: 17/976,634

(22) Filed: Oct. 28, 2022

(65) Prior Publication Data

US 2023/0052973 A1 Feb. 16, 2023

Related U.S. Application Data

(63) Continuation of application No. 16/292,965, filed on Mar. 5, 2019, now abandoned.
(Continued)

(51) Int. Cl.
*A41D 31/06* (2019.01)
*B32B 7/027* (2019.01)
*B32B 27/12* (2006.01)

(52) U.S. Cl.
CPC ............ *A41D 31/065* (2019.02); *B32B 7/027* (2019.01); *B32B 27/12* (2013.01); *B32B 2307/30* (2013.01);
(Continued)

(58) Field of Classification Search
CPC ...... A41D 31/065; D04B 21/00; B32B 3/266; B32B 15/08; B32B 15/14; B32B 15/04;
(Continued)

(56) References Cited

U.S. PATENT DOCUMENTS 2,387,320 A 10/1945 Foster
2,700,769 A 2/1955 Polchinski
(Continued)

FOREIGN PATENT DOCUMENTS

CN 101956271 A 1/2011
CN 104769834 A 7/2015
(Continued)

OTHER PUBLICATIONS

Japanese PTO Office Action dated Aug. 21, 2023, Patent Application No. JP2019-555649, 2 pages.
(Continued)

*Primary Examiner* — Jeremy R Pierce
(74) *Attorney, Agent, or Firm* — Davis Wright Tremaine LLP

(57) ABSTRACT

A thermally adaptive material configured to assume a lofted configuration and flat configuration in response to different temperatures. The thermally adaptive material includes an adaptive first textile layer with one or more sections of a first material that has a first thermal expansion coefficient and one or more sections of a second material disposed adjacent to the one or more sections of the first material, the one or more sections of the second material having a second thermal expansion coefficient that is different from the first thermal expansion coefficient. The thermally adaptive material also includes a second textile layer disposed opposing the adaptive first textile layer; a plurality of engaging portions between the first textile layer and second textile layer; and one or more cavities defined by the first and second layers that are generated while the adaptive textile is at least in a lofted configuration.

17 Claims, 7 Drawing Sheets

Related U.S. Application Data

(60) Provisional application No. 62/638,495, filed on Mar. 5, 2018.

(52) U.S. Cl.
CPC ...... *B32B 2437/00* (2013.01); *D10B 2401/04* (2013.01); *D10B 2501/04* (2013.01)

(58) Field of Classification Search
CPC .. B32B 15/02; B32B 7/05; B32B 7/08; B32B 27/08; B32B 5/022; B32B 5/026; B32B 5/26; B32B 5/06; B32B 5/12; B32B 5/04; B32B 5/024; B32B 27/02
See application file for complete search history.

(56) References Cited

U.S. PATENT DOCUMENTS

| | | | |
|---|---|---|---|
| 3,429,758 | A | 2/1969 | Young |
| 3,451,305 | A | 6/1969 | Johnson |
| 3,600,259 | A | 8/1971 | Smith |
| 5,127,783 | A | 7/1992 | Moghe et al. |
| 5,150,476 | A | 9/1992 | Statham et al. |
| 5,212,258 | A | 5/1993 | Irwin |
| 5,628,172 | A | 5/1997 | Kolmes et al. |
| 5,834,093 | A | 11/1998 | Challis et al. |
| 6,312,784 | B2 | 11/2001 | Russell et al. |
| 6,458,231 | B1 | 10/2002 | Wapner et al. |
| 6,767,850 | B1 | 7/2004 | Tebbe |
| 6,770,579 | B1 | 8/2004 | Dawson et al. |
| 7,291,389 | B1 | 11/2007 | Bitler et al. |
| 7,540,037 | B1 | 6/2009 | Bittler et al. |
| 7,754,626 | B2 | 7/2010 | Baron et al. |
| 7,976,924 | B2 | 7/2011 | Stanford, Jr. et al. |
| 8,187,984 | B2 | 5/2012 | Rock |
| 8,192,824 | B2 | 6/2012 | Rock et al. |
| 8,349,438 | B2 | 1/2013 | Laib et al. |
| 8,389,100 | B2 | 3/2013 | Rock et al. |
| 9,163,334 | B1 | 10/2015 | Fossey et al. |
| 9,903,350 | B2 | 2/2018 | Li et al. |
| 10,793,981 | B2 | 10/2020 | Ridley et al. |
| 11,686,024 | B2 | 6/2023 | Ridley et al. |
| 2001/0008821 | A1 | 7/2001 | Russell et al. |
| 2002/0190451 | A1 | 12/2002 | Sancaktar et al. |
| 2003/0007774 | A1 | 1/2003 | Christopher et al. |
| 2004/0062910 | A1* | 4/2004 | Morrison ............ A41D 31/065 428/137 |
| 2004/0266293 | A1 | 12/2004 | Thiriot |
| 2005/0204449 | A1 | 9/2005 | Baron et al. |
| 2005/0251900 | A1 | 11/2005 | Harlacker |
| 2006/0277950 | A1 | 12/2006 | Rock |
| 2007/0184238 | A1 | 8/2007 | Hockaday et al. |
| 2009/0176054 | A1 | 7/2009 | Laib et al. |
| 2011/0052861 | A1 | 3/2011 | Rock |
| 2011/0265242 | A1 | 11/2011 | Lambertz |
| 2013/0078415 | A1 | 3/2013 | Rock |
| 2013/0247536 | A1 | 9/2013 | Erlendsson et al. |
| 2013/0254969 | A1 | 10/2013 | Getzen et al. |
| 2014/0004295 | A1 | 1/2014 | Kiederle |
| 2014/0004332 | A1 | 1/2014 | Kanayama |
| 2014/0053311 | A1 | 2/2014 | Nordstrom et al. |
| 2014/0053312 | A1 | 2/2014 | Nordstrom et al. |
| 2014/0304896 | A1 | 10/2014 | Nordstrom et al. |
| 2015/0152852 | A1 | 6/2015 | Li et al. |
| 2016/0017870 | A1 | 1/2016 | Mather |
| 2016/0340814 | A1* | 11/2016 | Ridley ............. B32B 7/05 |
| 2018/0070657 | A1 | 3/2018 | Carter |
| 2018/0177248 | A1 | 6/2018 | Sneath et al. |
| 2019/0075868 | A1 | 3/2019 | Morgan |
| 2021/0025091 | A1 | 1/2021 | Ridley et al. |
| 2022/0202113 | A1 | 6/2022 | Bailey et al. |

FOREIGN PATENT DOCUMENTS

| | | |
|---|---|---|
| EP | 0900138 B1 | 1/2002 |
| EP | 3297471 A4 | 5/2019 |
| JP | H0711535 A | 1/1995 |
| JP | 2000234231 A | 8/2000 |
| JP | 2004197259 A | 7/2004 |
| JP | 2008517183 A | 5/2008 |
| JP | 2011510180 A | 3/2011 |
| JP | 2012087449 A | 5/2012 |
| JP | 2015053521 A | 3/2015 |
| JP | 2015533521 A | 11/2015 |
| JP | 2020507692 A | 3/2020 |
| KR | 20150038475 A | 4/2015 |
| RU | 2527710 C1 | 9/2014 |
| WO | 1999005926 A1 | 2/1999 |
| WO | 2006044210 A1 | 4/2006 |
| WO | 2009085384 A1 | 7/2009 |
| WO | 2012086584 A1 | 6/2012 |
| WO | 2013192531 A1 | 12/2013 |
| WO | 2014022667 A2 | 2/2014 |
| WO | 2014138049 A2 | 9/2014 |
| WO | 2016064220 A1 | 4/2016 |
| WO | 2016187547 A1 | 11/2016 |
| WO | 2016202813 A1 | 12/2016 |
| WO | 2017058339 A2 | 4/2017 |
| WO | 2017096044 A1 | 6/2017 |
| WO | 2017165435 A3 | 12/2017 |
| WO | 2018156761 A1 | 8/2018 |

OTHER PUBLICATIONS

Japanese PTO Office Action dated Aug. 3, 2023, Patent Application No. JP2022-092324, 4 pages.

Abel et al., "Hierarchical architecture of active knits," Smart Materials and Structures 22(12):125001, Nov. 1, 2013, 17 pages.

Abel, "Active Knit Actuation Architectures," Doctoral dissertation, University of Michigan, Mar. 2014, 161 pages.

Arghyros et al., "Mechanics of Texturing Thermoplastic Yarns. Part VIII: An Experimental Study of Heat Setting," Textile Research Journal 52(5):295-312, May 1982.

Beresford et al., "The Effect of Tension and Annealing on the X-ray Diffraction Pattern of Drawn 6.6 Nylon," Polymer 5:247-256, Jan. 1, 1964.

Buckley et al., "19—Heat-Setting of Drawn Polymeric Fibres: Anomalous Twist Recovery," The Journal of the Textile Institute 76(4):264-274, Jul. 1, 1985.

Buckley et al., "High-temperature viscoelasticity and heat-setting of poly(ethylene terephthalate)," Polymer 28(1):69-85, first disclosed Apr. 1982, print publication Jan. 1, 1987.

Canadian Office Action mailed Aug. 18, 2022, Application No. 2,986,043, 4 pages.

Chen et al., "Electromechanical Actuator Ribbons Driven by Electrically Conducting Spring-Like Fibers," Advanced Materials 27(34):4982-4988, Sep. 1, 2015.

Chen et al., "Hierarchically arranged helical fibre actuators driven by solvents and vapours," Nature Nanotechnology 10(12):1077-1083, plus Supplementary Notes, published online Sep. 14, 2015, print publication Dec. 2015, 50 pages.

Cherubini et al., "Experimental characterization of thermally-activated artificial muscles based on coiled nylon fishing lines," AIP Advances 5(6):067158, Jun. 2015, 12 pages.

China IPO Decision of Patent Grant mailed Apr. 26, 2022, Application No. 201880024236.5, 2 pages.

Communication Pursuant to Article 94(3) EPC for Patent Application No. 16 797 388.2 dated May 17, 2022, 6 pages.

Decristofano et al., "Temperature-adaptive Insulation Based on Multicomponent Fibers of Various Cross-sections," MRS Proceedings 1312:137-142, Jan. 2011.

Extended European Search Report for Application No. 18785006.0 dated Nov. 19, 2020, 8 pages.

Fossey et al., "Variable Loft Thermal Insulation for Temperature Adaptive Clothing," Solutions and Opportunities for the Safety and Protective Fabrics Industry, 4th International Conference on Safety and Protective Fabrics, Oct. 26, 2004, 18 pages.

Gupta et al., "Structure-Property Relationship in Heat-Set Polyethylene Terephthalate) Fibers. I. Structure and Morphology," Journal of Applied Polymer Science 29(10):3115-3129, Oct. 1984.

(56) References Cited

OTHER PUBLICATIONS

Gupta et al., "Structure-Property Relationship in Heat-Set Poly(ethylene Terephthalate) Fibers. II. Thermal Behavior and Morphology," Journal of Applied Polymer Science 29(12):3727-3739, Dec. 1984.
Gupta et al., "Structure-Property Relationship in Heat-Set Poly(ethylene Terephthalate) Fibers. III. Stress-Relaxation Behavior," Journal of Applied Polymer Science 29(12):4203-4218, Dec. 1984.
Gupta et al., "Structure-Property Relationship in Heat-Set Poly(ethylene Terephthalate) Fibers. IV. Recovery Behavior," Journal of Applied Polymer Science 29(12):4219-4235, Dec. 1984.
Gupta et al., "The Effect of Heat Setting on the Structure and Mechanical Properties of Poly(ethylene Terephthalate) Fiber. I. Structural Changes," Journal of Applied Polymer Science 26(6):1865-1876, Jun. 1981.
Gupta et al., "The Effect of Heat Setting on the Structure and Mechanical Properties of Poly(ethylene Terephthalate) Fiber. II. The Elastic Modulus and Its Dependence on Structure," Journal of Applied Polymer Science 26(6):1877-1884, Jun. 1981.
Gupta et al., "The Effect of Heat Setting on the Structure and Mechanical Properties of Poly(ethylene Terephthalate) Fiber. III. Anelastic Properties and Their Dependence on Structure," Journal of Applied Polymer Science 26 (6):1885-1895, Jun. 1981.
Gupta et al., "The Effect of Heat Setting on the Structure and Mechanical Properties of Poly(ethylene Terephthalate) Fiber. IV. Tensile Properties Other Than Modulus and Their Dependence on Structure," Journal of Applied Polymer Science 26(6):1897-1905, Jun. 1981.
Haines et al., "Artificial Muscles from Fishing Line and Sewing Thread," Science 343(6173):868-872, and Supplementary Materials, Feb. 21, 2014, 41 pages.
Hearle et al., "32-The Snarling of Highly Twisted Monofilaments. Part I: The Load-Elongation Behavior with Normal Snarling," The Journal of the Textile Institute 63(9):477-489, Sep. 1972.
Hearle et al., "33-The Snarling of Highly Twisted Monofilaments. Part II: Cylindrical Snarling," The Journal of the Textile Institute 63(9):490-501, Sep. 1972.
Hiraoka et al., "Power-efficient low-temperature woven coiled fibre actuator for wearable applications," Scientific Reports 6:36358, plus Supplementary Information, Nov. 4, 2016, 16 pages.
Hisu et al., "A dual-mode textile for human body radiative heating and cooling," Science Advances 3(11):e1700895, Nov. 10, 2017, 9 pages.
Hsu et al., "Personal Thermal Management by Metallic Nanowire-Coated Textile," Nano Letters 15(1):365-71, online publication Nov. 30, 2014, print publication Dec. 3, 2014.
Hsu et al., "Radiative human body cooling by nanoporous polyethylene textile," Science 353(6303):1019-1023, plus Supplementary Material, Sep. 2, 2016, 25 pages.
International Search Report and Written Opinion mailed Aug. 30, 2018, International Patent Application No. PCT/US2018/026941, filed Apr. 10, 2018.
International Search Report and Written Opinion mailed Jun. 26, 2019, Patent Application No. PCT/US2019/020756, filed Mar. 5, 2019, 7 pages.
International Search Report and Written Opinion mailed Oct. 6, 2016, International Patent Application No. PCT/US2016/033545, filed May 20, 2016.
Kianzad et al., "Nylon coil actuator operating temperature range and stiffness," SPIE 9430, Electroactive Polymer Actuators and Devices (EAPAD) 2015, Apr. 29, 2015, 6 pages.
Kianzad, "A Treatise on Highly Twisted Artificial Muscle: Thermally Driven Shape Memory Alloy and Coiled Nylon Actuators," Master's Thesis, University of British Columbia, Aug. 2015, 98 pages.
Kim et al., "Bio-inspired, Moisture-Powered Hybrid Carbon Nanotube Yarn Muscles," Scientific Reports 6:23016, Mar. 14, 2016, 7 pages.
Kim et al., "Dynamic Extension-Contraction Motion in Supramolecular Springs," Journal of the American Chemical Society 129(36):10994-10995, Sep. 12, 2007.

Korean IPO Decision of Patent Grant mailed Mar. 14, 2022, Application No. 10-2017-7036923, 2 pages.
Kunugi et al., "Mechanical properties and superstructure of high-modulus and high-strength nylon-6 fibre prepared by the zone-annealing method," Polymer 23(8):1199-1203, Jul. 1, 1982.
Lee et al., "High performance electrochemical and electrothermal artificial muscles from twist-spun carbon nanotube yarn," Nano Convergence 2(1):8, Dec. 1, 2015, nine pages.
Maziz et al., "Knitting and weaving artificial muscles," Science Advances 3(1):e1600327, Jan. 25, 2017.
Melvinsson, "Textile Actuator Fibres: Investigation in materials and methods for coiled polymer fibre muscles," Master's Thesis, The Swedish School of Textiles, University of Boras, Jun. 8, 2015, 60 pages.
Moretti et al., "Experimental characterization of a new class of polymeric-wire coiled transducers," Behavior and Mechanics of Multifunctional Materials and Composites 2015 9432:94320P, Apr. 1, 2015, 9 pages.
Murthy et al., "Effect of annealing on the structure and morphology of nylon 6 fibers," Journal of Macromolecular Science, Part B: Physics 26(4):427-446, Dec. 1, 1987.
Neukirch et al., "Writhing instabilities of twisted rods: from infinite to finite length," Journal of the Mechanics and Physics of Solids 50(6):1175-1191, Jun. 1, 2002.
Ogulata, "Air Permeability of Woven Fabrics," Journal of Textile and Apparel, Technology and Management 5(2):1-10, Jan. 2006.
Park et al., "Structure changes caused by strain annealing of nylon 6 fibers," Journal of Macromolecular Science, Part B: Physics 15(2):229-256, May 1, 1978.
Prevorsek et al., "Effect of Temperature and Draw Ratio on Force-Extension Properties of Twisted Fibers," Textile Research Journal 35(7):581-587, Jul. 1965.
Raviv et al., "Active Printed Materials for Complex Self-Evolving Deformations," Scientific Reports 4:7422, Dec. 18, 2014, 8 pages.
Sharafi et al., "A multiscale approach for modeling actuation response of polymeric artificial muscles," Soft Matter 11(19):3833-3843, Mar. 30, 2015.
European Patent Office Communication pursuant to Article 94(3) EPC dated Nov. 30, 2023, Application No. 18785006.0, 4 pages.
Japanese PTO Decision of Appeal dated Nov. 21, 2023, Patent Application No. JP2019-555649, 2 pages.
Canadian Office Action mailed May 16, 2023, Application No. 2,986,043, 4 pages.
Statton, "High-Temperature Annealing of Drawn Nylon 66 Fibers," Journal of Polymer Science Part B: Polymer Physics 10(8):1587-1592, Aug. 1, 1972.
Stoffberg et al., "The Effect of Fabric Structural Parameters and Fiber Type on the Comfort-related Properties of Commercial Apparel Fabrics," Journal of Natural Fibers, Oct. 13, 2015, 15 pages.
Suzuki et al., "Application of a high-tension annealing method to nylon 66 fibres," Polymer 39(6-7):1351-1355, Jan. 1, 1998.
Timoshenko, "Analysis of Bi-Metal Thermostats," Journal of the Optical Society of America 11(3):233-255, Sep. 1, 1925.
Tsujimoto et al., "Changes in Fine Structure of Nylon 6 Gut Yarns in Twisting, Annealing and Untwisting Processes," Journal of the Textile Machinery Society of Japan 25(4):87-92, Dec. 1979; first disclosed in Journal of the Textile Machinery Society of Japan 31(12):T171-5, Dec. 25, 1978.
Tugrul, "Air Permeability of Woven Fabrics," JTAM, 2006, 10 pages.
Van Der Heijden et al., "Helical and Localised Buckling in Twisted Rods: A Unified Analysis of the Symmetric Case," Nonlinear Dynamics 21(1):71-99, Jan. 1, 2000.
Yang et al., "A top-down multi-scale modeling for actuation response of polymeric artificial muscles," Journal of the Mechanics and Physics of Solids 92:237-259, online publication Apr. 6, 2016, print publication Jul. 2016.
Zhang et al., "Multiscale deformations lead to high toughness and circularly polarized emission in helical nacre-like fibres," Nature Communications 7:10701, Feb. 24, 2016, 28 pages.
Canadian Office Action mailed Jun. 3, 2024, Application No. 3,056,441, 6 pages.

(56) References Cited

OTHER PUBLICATIONS

Japan IPO Final Office Action date May 13, 2024 in Application No. 2022-092324, 2 pages.
European Patent Office Communication pursuant to Article 94(3) EPC dated Nov. 14, 2024, Application No. 16797388.2, 5 pages.
Japan IPO Notice of Patent Grant dated Nov. 6, 2024 in Application No. 2022-092324, 2 pages.
USPTO Office Action dated Sep. 28, 2024 in U.S. Appl. No. 17/976,634, 7 pages.
USPTO Office Action dated May 16, 2025, U.S. Appl. No. 18/232,222, 13 pages.

* cited by examiner

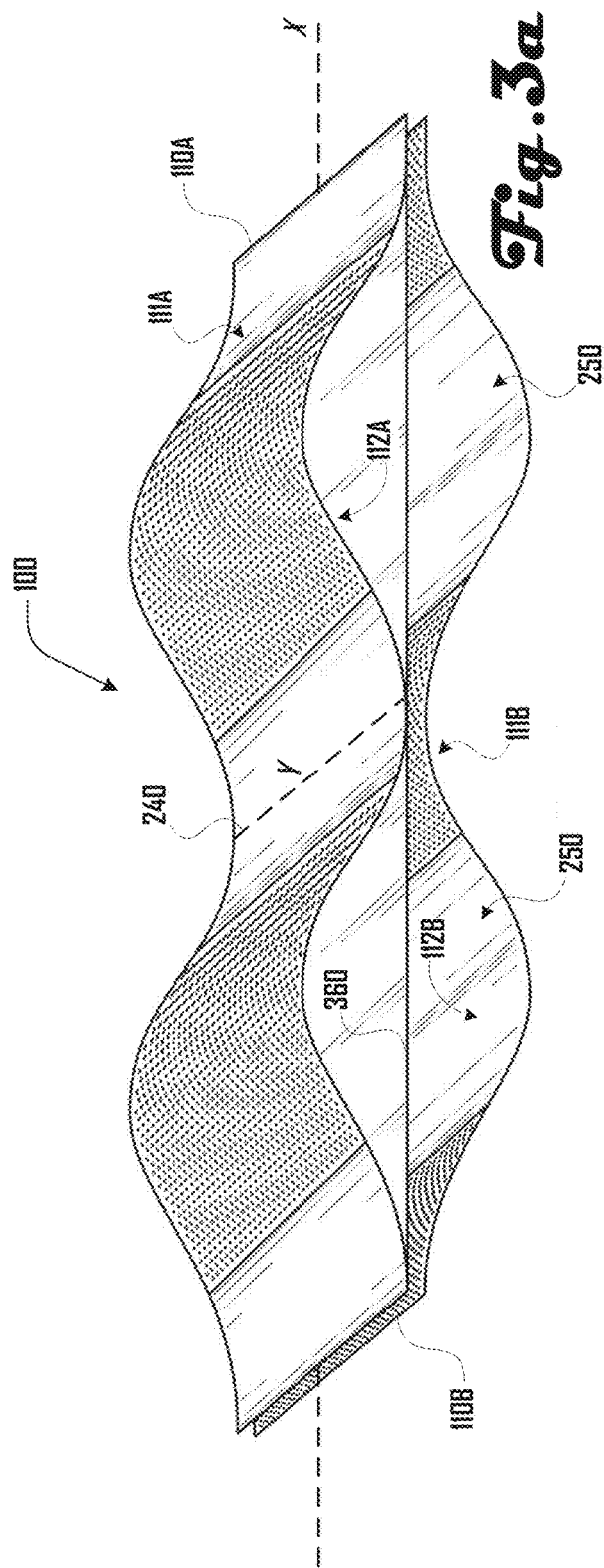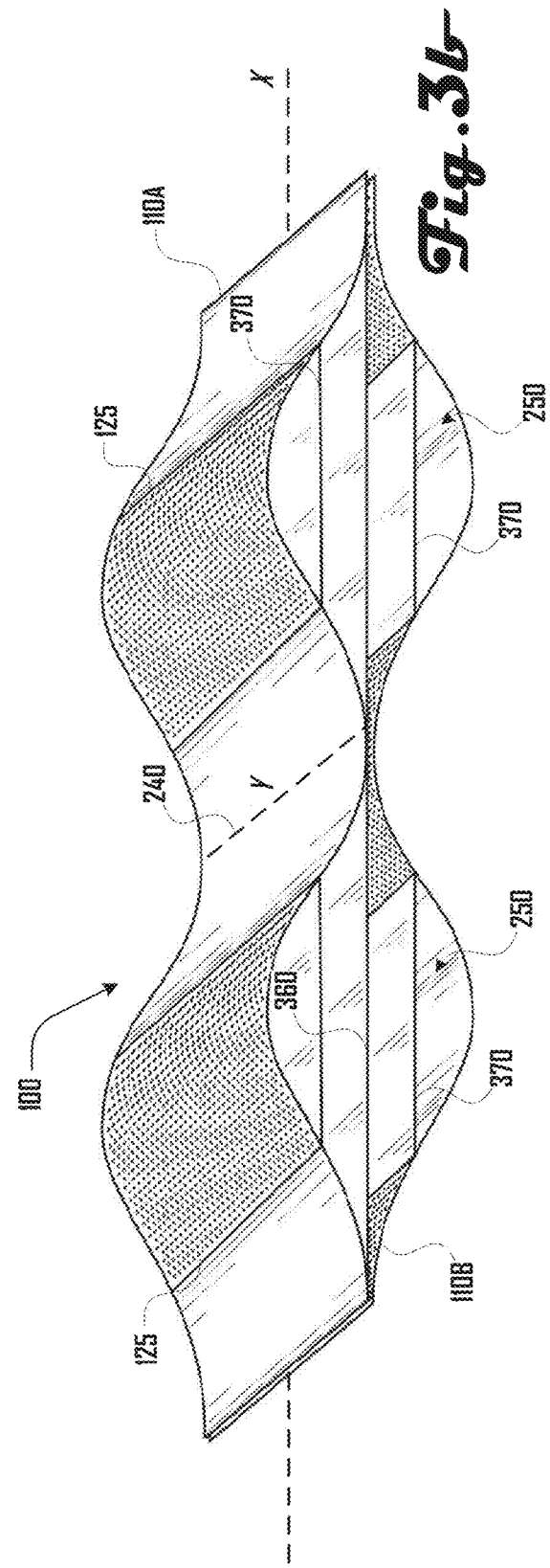

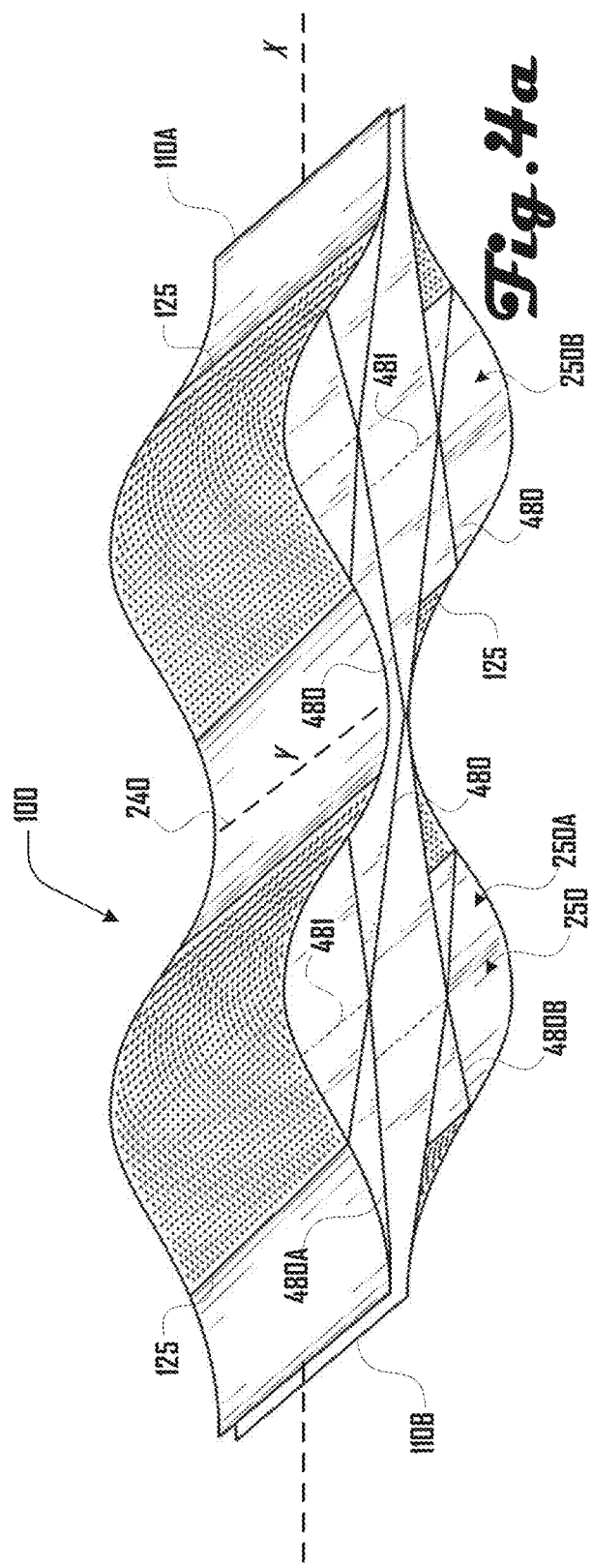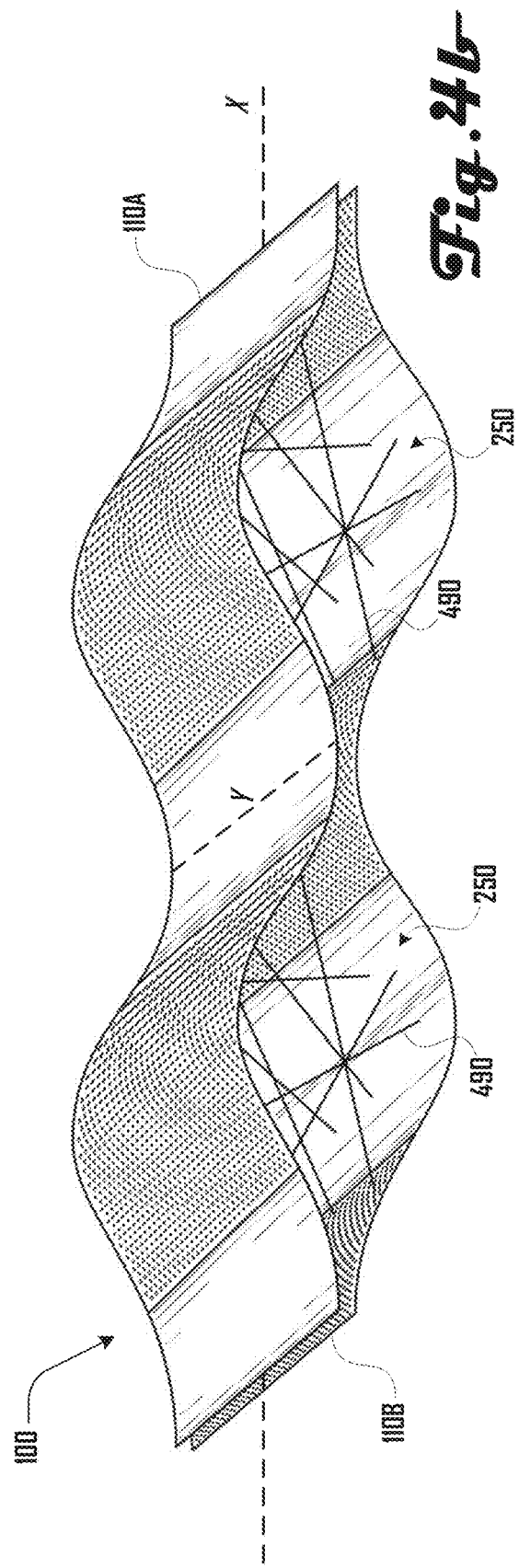

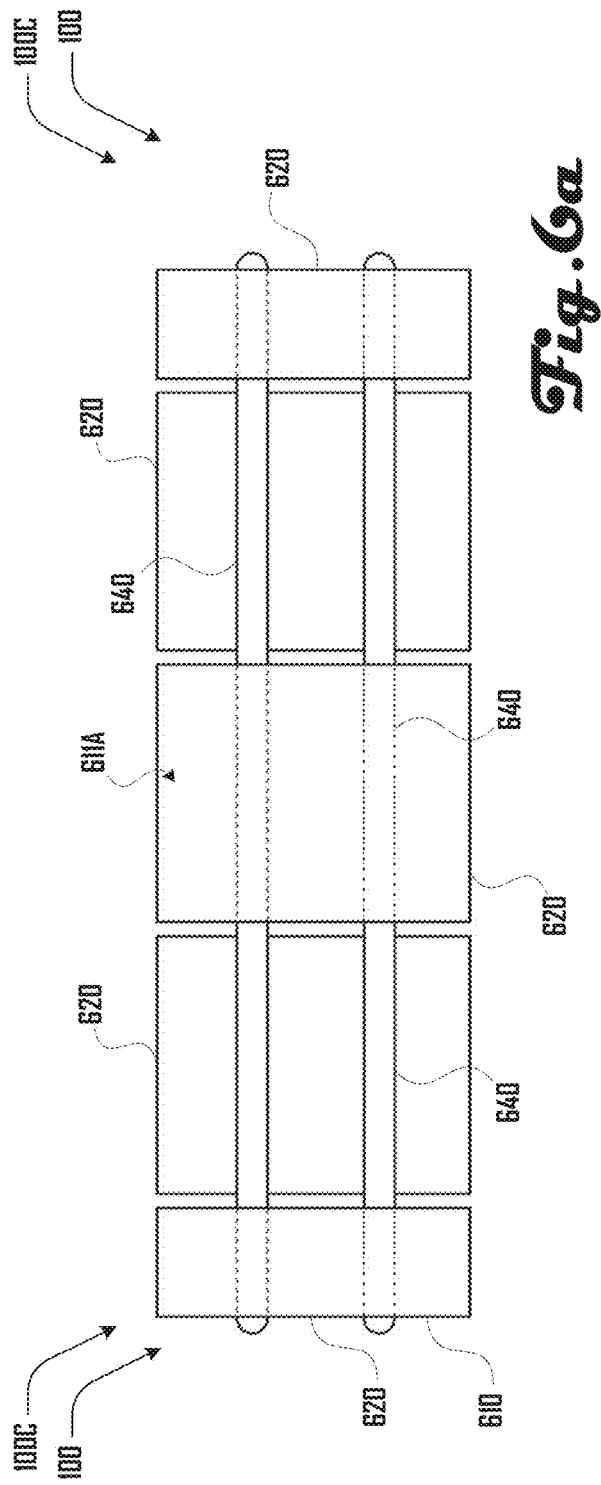
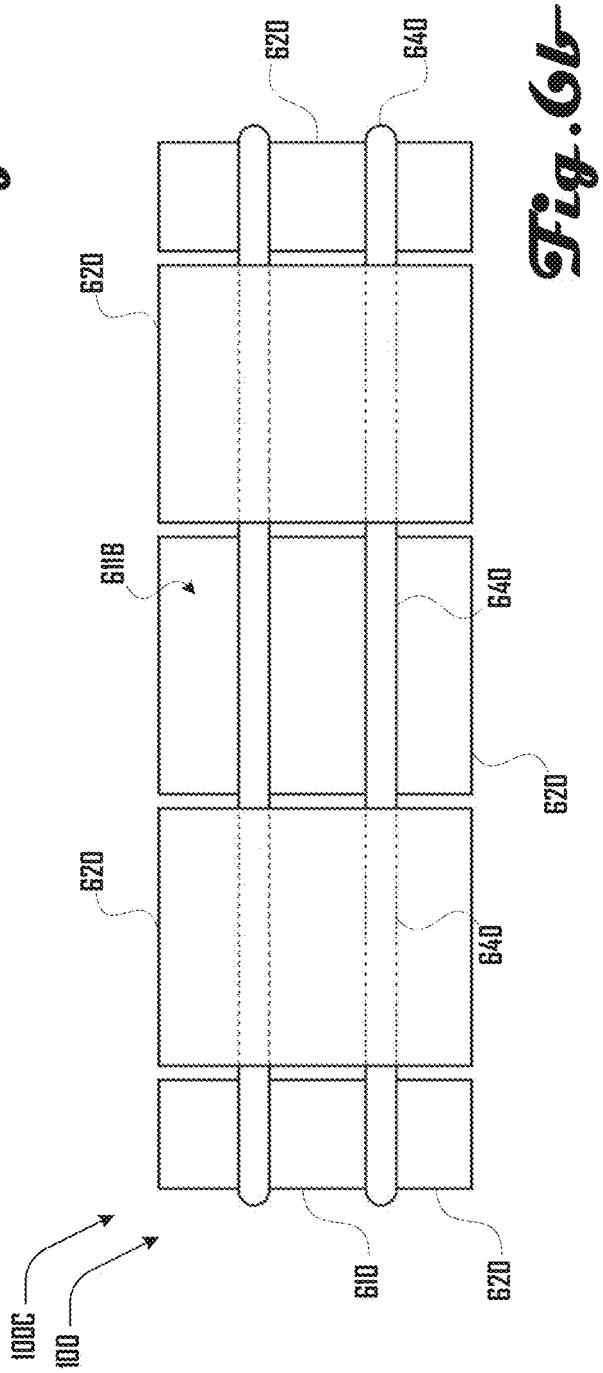

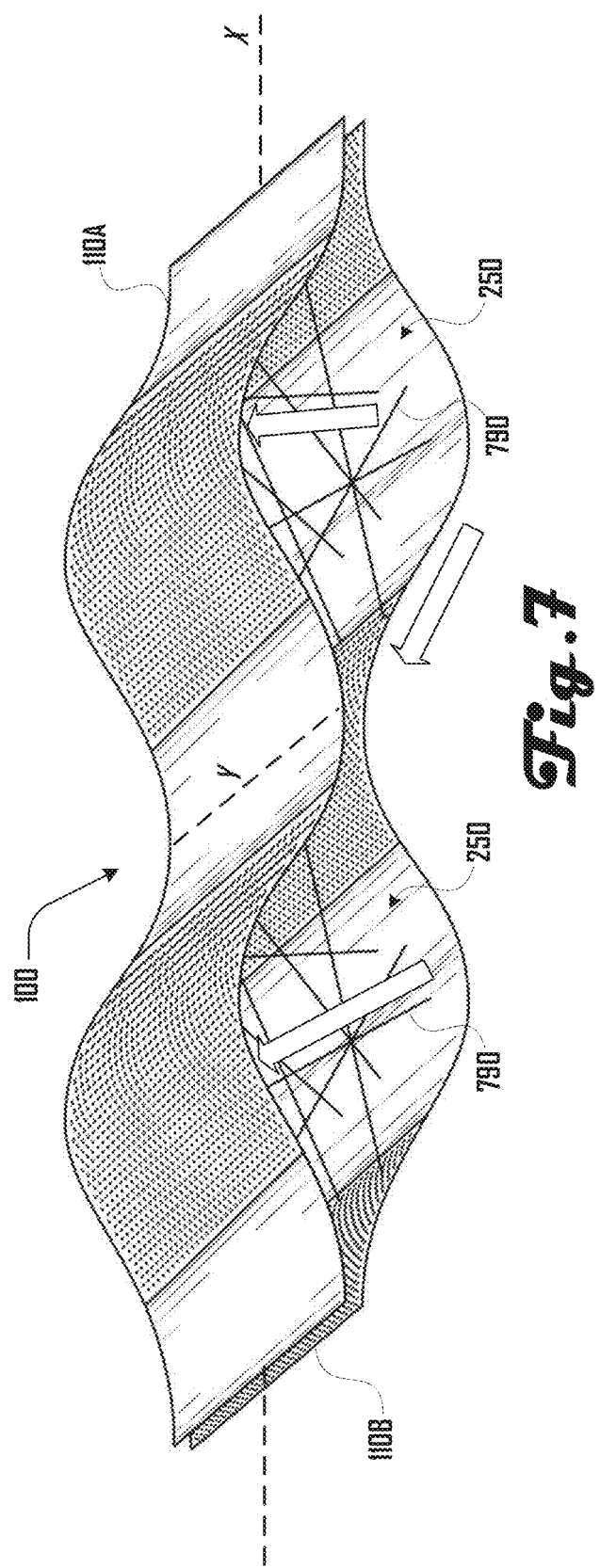

THERMALLY ADAPTIVE FABRICS AND METHODS OF MAKING SAME

CROSS-REFERENCE TO RELATED APPLICATION

This application is a continuation of U.S. application Ser. No. 16/292,965, filed Mar. 5, 2019, which claims priority to U.S. Provisional Application No. 62/638,495, filed Mar. 5, 2018, which applications are hereby incorporated herein by reference in their entirety and for all purposes.

GOVERNMENT LICENSE RIGHTS

This invention was made with Government support under DE-AR0000536 awarded by the U.S. Department of Energy. The Government has certain rights in this invention.

BRIEF DESCRIPTION OF THE DRAWINGS

FIG. 1b illustrates a plan view of an external face of the first layer of the adaptive fabric of FIG. 1a. FIG. 1b also illustrates a plan view of the underside of the second layer of the adaptive fabric of FIG. 1a.

FIG. 1c also illustrates a plan view of the internal face of the second layer of the adaptive fabric of FIG. 1a.

FIG. 3a illustrates an adaptive fabric having a third layer disposed between the first and second layers.

FIG. 3b illustrates an adaptive fabric having a third layer disposed between the first and second layers and a plurality of additional layers extending within cavities of the adaptive fabric.

FIG. 4a illustrates an example of an adaptive fabric having a plurality of internal layers extending within and between a pair of cavities with the internal layers intersecting at junctions.

FIG. 4b illustrates one embodiment where fibers extend within cavities of an adaptive fabric.

FIGS. 6a and 6b illustrate respective first and second faces of an embodiment of an alternating bimorph structure comprising an environmentally responsive yarn and a constraining textile that has a different environmental response than the yarn.

FIG. 7 illustrates an example of an alternating bimorph structure in a lofted configuration with wicking fibers disposed within cavities defined by opposing layers of the structure.

Figure 1A:
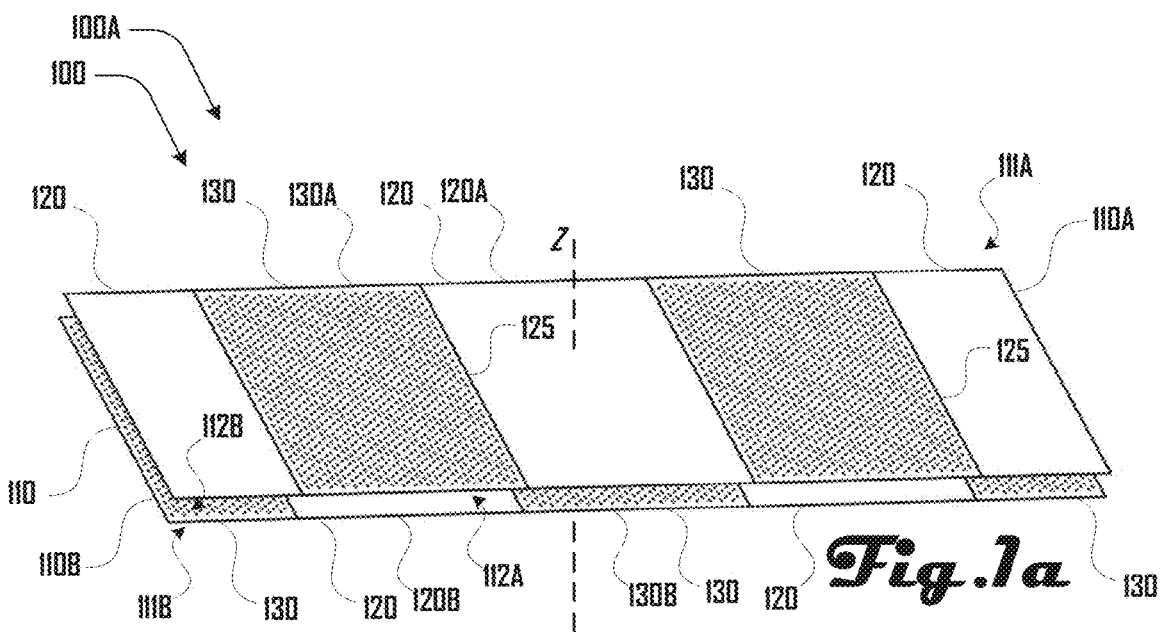
FIG. 1a illustrates an example embodiment of an adaptive fabric comprising a first and second layer with each layer comprising a first and second material.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Structural features of adaptive textiles can impact properties that are of practical consequence to the performance and characteristics of the textiles. For an adaptive textile, such as a thermally adaptive textile, the adaptive response can be important in some embodiments, but other characteristics can be equally important in certain applications. The thermal response can include the magnitude of the response (e.g., change in insulation per change in temperature) and the range or limits of the response (e.g., temperature above or below which the thermal response becomes much smaller or becomes unimportant). Other properties, such as the air permeability, moisture vapor transport, and wicking, can also be important for thermal comfort, and properties such as weight, thickness, hand feel, drape, abrasion resistance, and sheen can be important for appearance and practical performance.

In various embodiments, a thermally adaptive material can be a material that alters its insulation value in response to changes in temperature. Such thermal actuation can be achieved through the use of bimorphs or, alternatively, materials that undergo a phase change at a temperature of interest, including but not limited to shape memory polymers and materials that undergo a glass transition. In some embodiments, it can be desirable for bimorphs to respond continuously to temperature changes, bending or straightening as temperature changes.

In contrast, some example materials respond with a phase change that occurs at a discrete temperature, creating a stepped response to temperature. Such materials can be used in accordance with various embodiments to achieve a continuous response profile by using a set of materials with different phase change temperatures.

In various embodiments, a bimorph can comprise two or more materials laminated, glued, welded, or otherwise joined, held, or constrained to be together in any suitable way. In some embodiments, a bimorph can possess distinct thermal expansion characteristics such that as the environmental temperature changes, one side of the bimorph expands more than the other, causing the bimorph to bend. A bimorph can have a "flat temperature"—a temperature where the structure is flat. In some embodiments, both above and below such a "flat temperature," the bimorph can curve in opposite directions due to the difference in thermal expansion in the two layers.

This temperature-controlled bending in bimorphs can be leveraged to construct fabrics and garments with temperature-dependent properties—for example, fabrics that become thicker when temperatures drop, thereby becoming more insulating, and/or fabrics that become more open when temperatures increase, thereby becoming more porous and allowing for more cooling.

In order to achieve the relatively large changes in thickness that can be desirable for a thermally adaptive material, the arrangement of bimorph fibers, ribbons, sheets, fabrics, or the like, can be controlled so that the combined changes across multiple layers yield the desired change.

The pairing of two dissimilar materials to form a bimorph, where the physical geometry or length of each of the materials depends on a feature of the environment (temperature, moisture, etc.), can yield structures that translate relatively small changes in length (in some embodiments a 10% change or less) into relatively large changes in effective height (in some embodiments a 100% increase or greater).

In some embodiments it may be advantageous to have an alternating or double-sided structure where a first material or substrate has a second material with a different coefficient of thermal expansion patterned or laid out on both sides of the first material, where the patterns alternate, causing the individual bimorph to bend in an alternating fashion in response to temperature change. Alternating bimorph structures can have regions of local curvature and bending without long-range bending. The length and thicknesses of the two materials that minimally comprise the bimorph can be selected for a desired curvature for a given temperature change and can be controlled to create zones of varied curvature within the alternating bimorph layer.

For fiber materials like nylon and polyester, bulk coefficient of thermal expansion (CTE) values can be about 0.05 mm/m/° C., but not exceed about 0.1 mm/m/° C. In drawn fibers or sheets, the ordering of polymeric chains can give rise to anisotropic properties and CTE values can drop by a factor of 10 or more, even becoming negative in some cases. However, in some embodiments, a material's thermomechanical response can be effectively amplified through the use of a coil or spring structure. Commodity fibers and yarns can be coiled or "cylindrically snarled" through the insertion of a high level of twist, producing coiled thermal actuators that have been described as "artificial muscles". These coiled fiber or yarn actuators can have giant or exaggerated thermal expansion properties.

In a bimorph, the difference in CTE values of the two constituent materials of the bimorph can indicate the magnitude of the bending or physical response to a change in temperature. With conventional synthetic and natural materials commonly used in textiles (such as polyester, nylon, cotton, and wool) the difference in CTE (ACTE) can be 100-200 μm/m/K, which may be too small to be desirable for some embodiments. Accordingly, various embodiments of a bimorph can comprise a highly twisted polymer coil actuator which in some embodiments can have an effective CTE value of 1000 μm/m/K or more, leading to a ACTE also on the order of 1000 μm/m/K. Such large CTE values can find use in bimorph and bilayer structures having desirable deflection or bending characteristics. Any material with especially large CTE values might be useful in this manner, not just twisted polymer coil actuators. Twisted polymer coil actuators can be produced with either large positive CTE (expanding with increased temperature) or large negative CTE values (contracting with increased temperature). In some embodiments it can be desirable to pair positive and negative CTE materials in a bimorph to maximize ΔCTE.

Many of the following embodiments are illustrated with an alternating bimorph structure where the two materials that comprise the bimorph are presented on either face of the bimorph in an alternating way. This alternating bimorph structure can enable a bimorph sheet or fabric to have short-range curvature that gives rise to an increase in effective thickness, which can be of use in increasing effective insulation values in adaptive materials, while not having long-range curvature. In sheet structures these alternating bimorphs can have a discontinuous material joined on alternating sides of a substrate, forming bimorphs with the discontinuous material facing two opposing sides of the material in an alternating manner. These bimorphs are illustrated as sheets in some examples but can be made in textiles where the two materials of the bimorph may be continuous in some embodiments, and the materials of the bimorph comprise a conventional yarn with only a small dimensional response to a change in temperature, moisture, or other environmental parameter, and a highly twisted and/or coiled fiber or yarn actuator that, in some embodiments, has a large dimensional response to a change in temperature, moisture, or other environmental parameter. Textile structures and materials can afford continuity in the first and second materials of a bimorph structure because fibers and yarns can interlace and be presented at either face of a knit, woven, or nonwoven textile. The two materials can be constrained and held adjacent to each other within the structure of a knit, woven, or a nonwoven, forming the bimorph structure and giving rise to the desired geometric response in the textile structure. An individual fiber or yarn in a textile structure might be able to bend or buckle in any number of directions but the structure of the textile can, in some embodiments, constrain the fiber or yarn so that it moves in a preferred direction and contributes to a change in fabric loft or porosity. Constraint can come from the presence of neighboring materials that block or impede motion, from thermal bonds or welds, from adhesives, from stitches or fibers or yarns in the textile, or from another suitable connection between the two or more materials of the bimorph structure.

Many of the following embodiments are illustrated with an alternating bimorph structure where two separate alternating bimorph structures form a plurality of cavities or pockets, but individual bimorphs, bimorph sheets, and bimorph fabrics can also form one or more cavities when joined, coupled, or engaged with a second surface or textile that does not need to be adaptive or comprise bimorph structures.

The term bimorph, as discussed herein, describes two materials paired together so that they collectively bend or undergo a physical distortion in response to one or more suitable environmental condition, including but not limited to temperature, humidity and/or exposure to liquids (e.g., saturation by liquids). For example, in some embodiments it can be desirable for adaptive insulation in a garment to respond to both temperature changes and moisture changes (e.g., based on humidity and/or sweat of a user). Accordingly, the use of moisture-sensitive polymers and other suitable materials in various bimorph structures can be configured to be both temperature and moisture responsive. Such materials might be primarily responsive to moisture or chemical stimulus. In some embodiments, bimorph structures can exist in a textile structure, such as a weave, knit, or nonwoven, where two fibers, groupings of fibers, or fiber layers in the structure are substantially paired together such that their collective behavior is similar to that of a laminated bimorph. Any of these bimorphs can be made from a single material in two different forms or with different structures or processing histories such that the two layers possess different thermal expansion characteristics, different responses to moisture, or different responses to some other external stimulus.

Adaptive textiles can change their effective thickness in response to an environmental change (such as temperature or humidity), forming small pockets that increase the effective thickness of the fabric, trapping air so that the insulation increases (conversely, upon decreasing in thickness and trapping less air, insulation decreases). For example, related U.S. patent application Ser. No. 15/160,439, filed May 20, 2016 (publication no. 2016/0340814) describes example adaptive textiles. This application is hereby incorporated herein by reference in its entirety and for all purposes.

In some embodiments it can be advantageous to partially fill or occupy pockets or cavities that dynamically expand and contract in the adaptive fabric as the fabric responds to varying ambient conditions. In some embodiments this can contribute to the insulation or thermal comfort afforded by the textile in some applications. In some examples, it can be desirable for the material filling the pocket or cavity to not add a large thickness or mass to the overall fabric structure. For example, in some embodiments it can be desirable for any material disposed within an adaptive cavity to no more than double the flat thickness of the adaptive structure relative to its flat thickness when the material is absent from the cavity. In some embodiments it is desirable to partially fill the dynamic cavity space with thin fibers that have little structural integrity of their own, thereby minimally impacting both the thickness of the textile (because the filling fibers do not resist flattening, they add very little thickness to the fabric, even at higher temperatures) and the magnitude of its stimuli response (because the filling fibers do not restrict lofting). However, in some embodiments, the material filling the pockets or cavity may add some thickness or mass to the overall fabric structure, which is acceptable for some applications. In some embodiments it can be desirable for fibers in the dynamic cavity or cavities formed in an adaptive textile to connect to opposite inner faces of the cavity so that the fibers cross or span the entire cavity.

Figure 1B:
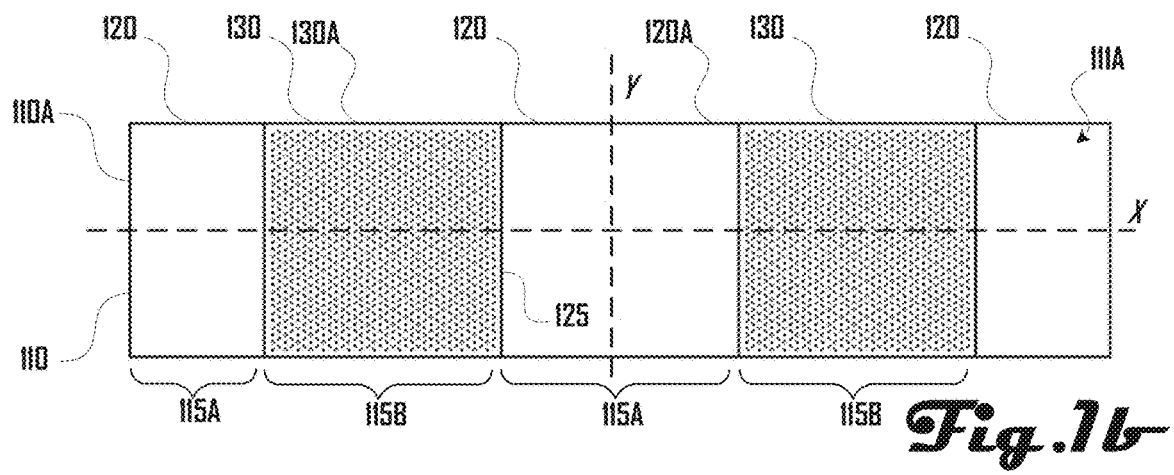
Figure 1C:
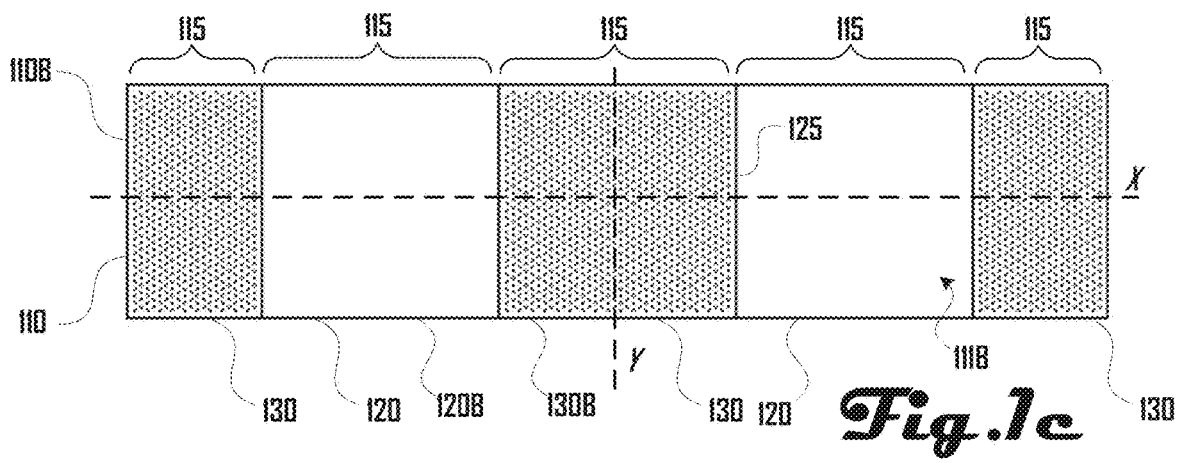
FIG. 1c illustrates a plan view of the underside of the first layer of the adaptive fabric of FIG. 1b.

Turning to FIG. 1a, an example embodiment 100A of an adaptive fabric 100 is illustrated comprising a first and second layer 110A, 110B, with each layer 110 comprising a first material 120 and second material 130. FIG. 1b illustrates a front view of an external face 111A of the first layer 110A of the adaptive fabric 100 of FIG. 1a. FIG. 1c illustrates a front view of an external face 111B of the second layer 110B of the adaptive fabric of FIG. 1a. FIG. 1b and FIG. 1c also represent the opposite, reverse-side faces of each other. In the illustrated structure, materials 120 and 130 of some examples always sit on opposite faces of the same layer, so that if 120 is on the visible face the material 130 is on the underside in the same, matching pattern, and if material 130 is on the visible face then material 120 is on the underside in the same, matching pattern.

As shown in FIGS. 1a-c, each of the layers 110 can comprise alternating successive sections 115 of the first and second materials 120, 130 along a length of the fabric 100 with the respective sections 115 of the first and second materials 120, 130 being coupled at a junction 125. In this example embodiment 100A, the adaptive fabric 100 and layers 110 extend along axes X and Y that define an XY plane, while the adaptive fabric is in a flat configuration. The sections 115 of the first and second material 120, 130 can alternate along axis X with the junctions 125 between sections 115 being parallel to axis Y. However, in further embodiments, the sections 115 of the first and second materials 120, 130 can be disposed in other suitable configurations. For example, in other embodiments, the junctions 125 may not be parallel to each other and/or parallel to axis Y.

Additionally, as shown in FIGS. 1a-c, the layers 110 can be disposed such that alternating sections 115 of the first and second material 120, 130 are aligned in adjacent layers 110. For example, the first materials sections 120A of the first layer 110A align with second materials sections 130B of the second layer 110B. Similarly, the second materials sections 130A of the first layer 110A align with first materials sections 120B of the second layer 110B. Additionally, aligning sections 115 of the first and second materials 120, 130 on the respective layers 110 can have corresponding widths (e.g., along the Y axis) such that the junctions 125 of opposing layers 110 are adjacent and aligned. In such arrangements the interior faces are opposed, with materials sections 120 of the not-visible, inner face of first layer 110A opposite materials sections 120 of the visible, inner face of second layer 110B. In other embodiments adaptive fabrics 110A and 110B might be rotated with respect to each other.

Figure 2:
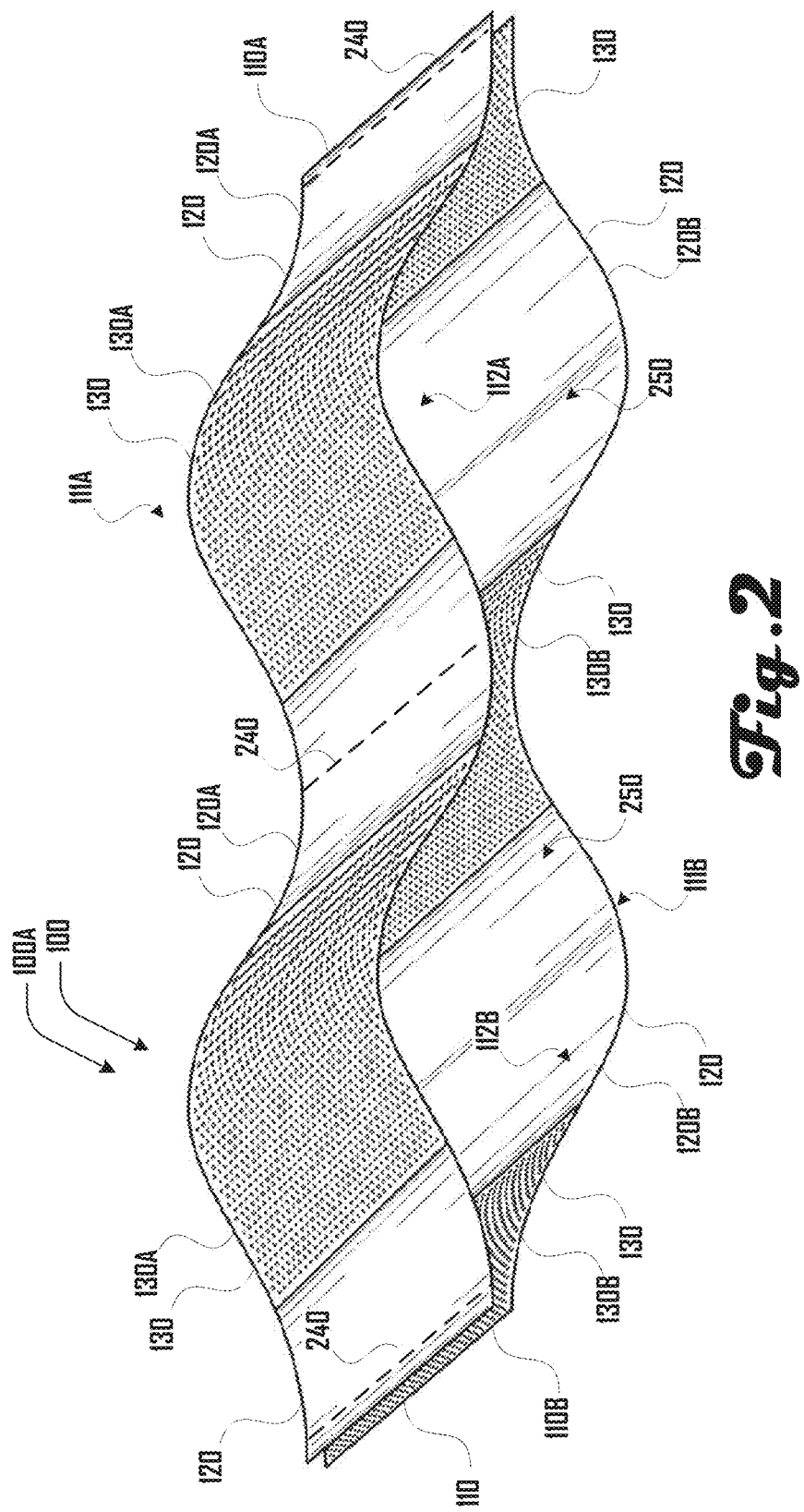
FIG. 2 illustrates the adaptive fabric of FIGS. 1a-c in a lofted configuration.

In various embodiments, the first and second materials 120, 130 can experience different dynamic responses to one or more environmental conditions such as temperature, humidity, and the like. For example, at a first temperature, the adaptive fabric 100A can assume a flat configuration as shown in FIG. 1a, and at a second temperature, the adaptive fabric 100A can assume a lofted configuration as shown in FIG. 2. More specifically, portions of the layers 110 can bend in response to the second temperature such that the adaptive fabric 100A forms cavities 250 between the layers 110 as shown in FIG. 2.

For example, sections 115 of layers 110 that have the portions of the first material 120 on the outer, exposed surface, can bend in the same direction and the portions with the second material 130 on the outer, exposed surface can bend in an opposite direction. In some embodiments, each bending segment 115, in isolation, can comprise a bimorph structure with materials 120 and 130, each with a different dimensional response to an environmental change such as temperature. The combined action of the two materials 120, 130 can give rise to the bend in the segment 115. Segments 115A are shown as having an opposite orientation compared to segments 115B.

In various embodiments, structures can comprise one or more layers 110A, 110B as shown in FIGS. 1a-1c. For example, in the embodiment of FIG. 2, a structure 100 is shown comprising a first and second layer 110. In some embodiments, each of the layers 110 can comprise both layers or faces 110A, 110B as shown in FIGS. 1a-1c. In other words, the pair of layers 110A, 110B shown in FIGS. 1a-1c can be coupled together to define a single unitary layer 110 with two such unitary layers 110 defining the two layers 110 as shown in FIG. 2, where opposite faces of the layer 110 can be represented by the layer illustrations 110A and 110B. In other words, the structure of FIG. 2 can comprise both layers 110A and 110B in a first top layer 110 and can comprise both layers 110A and 110B in a second bottom layer 110. However, in some embodiments of the structure of FIG. 2, a first layer 110 can consist essentially of one layer 110A and a second layer 110 can consist essentially of one layer 110B.

Accordingly, in various embodiments, sections 115 of a layer 110 can comprise both the first and second materials 120, 130 stacked and coupled to generate a bimorph structure. In other words, in some embodiments first sections 115A can have an opposite orientation compared to second sections 115B with both first and second sections 115A, 115B including both the first and second materials 120, 130. However, in some embodiments, sections 115 of a layer 110 can consist essentially of only the first material 120 or only the second material 130. In the following descriptions and related illustrations, it should be clear that such variations of layers 110 having one or more of layers 110A, 110B are within the scope of such descriptions and illustrations, even if some example illustrations show or appear to show only layers 110 having a single layer 110A or 110B. Additionally, descriptions of layers 110A or 110B should also be construed to encompass some embodiments where a layer 110A also includes a layer 110B and where a layer 110B also includes a layer 110A. Furthermore, striped structures are shown for clarity and to describe a basic unit of functionality with two paired materials differentially responding to environmental change to bring about geometric change, but more complicated structures are possible, as well, including stripes of different widths, stripes at different angles, bubbles or dots in square or hexagonal arrays or in a more complicated pattern or scheme, or others suitable for bringing about geometric change in the structure in response to ambient change. For clarity the illustrations also show multilayer structures where each layer is the same in structure and is in a mirrored or opposite arrangement with respect to the other layer, but layers need not be the same nor do they need to be similarly oriented and can in fact be rotated with respect to each other. Additionally, in some embodiments it is desirable to combine an adaptive layer with a non-adaptive, static layer, forming a dynamic cavity between the adaptive layer and the static layer.

In the example of FIG. 2, opposite bending of the first and second sections 115A, 115B can cause the internal faces 112A, 112B of the layers 110 to bend away from each other and generate cavities 250 that extend along axis Y between the layers 110. Similarly, opposite bending of the first and second sections 115A, 115B can also reinforce the internal faces 112A, 112B of the layers 110 bending away from each other to leave engaging portions 240 of the respective layers 110A, 110B. In some embodiments, the first and second layers 110A, 110B can be coupled along the engaging portions 240 via a seam, adhesive, weld, coupling structure, or the like. However, in some embodiments, the first and second layers 110A, 110B may not be physically coupled along the engaging portions 240 with the layers merely engaging along the respective internal faces 112A, 112B of the layers 110A, 110B.

Some examples can comprise physically discrete first and second materials 120, 130 that are coupled at a junction 125 in various suitable ways including via a seam, adhesive, weld, coupling structure, or the like. However, in further embodiments, the first and second materials 120, 130 can be defined by different portions of a contiguous fabric wherein the first and second materials 120, 130 are defined by portions having the contiguous fabric having different compositions and/or textile structures. For example, where the adaptive fabric 100 comprises a woven, knit, or nonwoven fabric having fibers, yarns, threads, or the like, the first and second materials 120, 130 can be defined by portions having different compositions of such fibers, yarns, threads, or the like.

In some embodiments, such different compositions can include some of the same materials or can be defined by portions that are mutually exclusive. In some embodiments, one or both of the first materials 120, 130 can comprise any of structures or materials as described in U.S. patent application Ser. No. 15/160,439, filed May 20, 2016, referenced above. Also, in some embodiments, the first and second materials 120, 130 can be the same material. For example, the first and second materials 120, 130 can be the same material with an opposite orientation. As another example, first and second materials 120, 130 can be the same material with a different processing history.

The figures show structures of finite width (in the Y direction) and length (in the X) direction, but the structures can be repeated or extended in these dimensions to create large planes, sheets, or fabrics, of arbitrary size. The figures also show a structure that is undergoing differential dimensional change in the X dimension that leads to a bending and increase in loft in the Z dimension. The figures do not show cases where there is appreciable change in the Y dimension, but such structures are possible and can produce bumps or bubbles in response to environmental change instead of the ridges or waves illustrated in the figures. Just as a change in the X dimension can produce a change in loft in the Z dimension, in some textile structures a change in X can also bring about changes in the Y dimension or changes in both Y and Z dimensions. FIGS. 1-4 and 7 show multilayer structures to draw attention to the pocket that can form between two adaptive layers, but single layers can also undergo similar changes and in some embodiments are preferred due to their ability to achieve a smaller minimum thickness. Furthermore, multilayer structures are not limited to two layers and a plurality of cavities 250 can form between a number of individual layers 110, and adaptive fabrics 100 can comprise one, two, three, four, five, six, seven, eight, nine, ten, fifteen, twenty five, fifty, one hundred, or other suitable number of environmentally responsive layers 110.

Additionally, while illustrative examples herein are shown comprising a first and second material 120, 130, further embodiments can comprise any suitable plurality of materials in various suitable configurations. For example, adaptive fabrics 100 can comprise three, four, five, six, seven, eight, nine, ten, fifteen, twenty five, fifty, one hundred, or other suitable number of materials in various suitable configurations.

Such suitable configurations can include alternating patterns of materials. For example, if the adaptive fabric 100A shown in FIGS. 1a-c and 2 are defined as having a repetitive pattern of A:B:A:B:A:B on opposing offset sheets 110A, 11B, further embodiments can include a pattern of A:B:A:C:A:B:A:C:A or A:B:C:B:A:B:C:B:A, or the like. Accordingly, the examples shown herein should not be construed to be limiting on the wide variety of alternative embodiments that are within the scope and spirit of the present disclosure.

Although the example adaptive fabric 100A shown in FIGS. 1a-c and 2 is configured to generate two cavities 250, further embodiments can be configured to generate a plurality of cavities 250 between layers 110 with the cavities 250 having a maximum distance between internal faces 112A, 112B of the layers 110A, 110B being about 1 cm. Additionally, the width of the cavities 250 (e.g., between respective engaging portions 240) can be about 4 cm. Adaptive fabric structures of arbitrary size can be made so that cavity heights and widths can be substantially larger or smaller, as desired and appropriate for an application.

In various embodiments, fibers, sheets, fabrics or other suitable materials can be disposed between layers 110 of an adaptive fabric 100. For example, FIGS. 3a, 3b, 4a and 4b illustrate example embodiments of an adaptive fabric 100 comprising various example structures disposed between layers 110 of an adaptive fabric 100 and within cavities 250 of the adaptive fiber 100. In some embodiments it can be desirable for these structures and materials disposed within cavities 250 to not be separated from each other by a distance much larger than 5 mm, or in other embodiments they may not be separated by a distance larger than 2 mm.

Fibers that fill cavities 250 can be made of natural or synthetic materials; can be staple or continuous fibers or synthetic or natural clusters such as down clusters; and can be incorporated in a number of suitable ways. A nonwoven batting can also be used to fill in the dynamic cavities 250 of an adaptive fabric 100. In some embodiments it can be advantageous to partially fill the cavities 250 of the adaptive fabric 100 with a yarn that undergoes either a permanent or reversible change in response to an environmental stimulus, such as a yarn that irreversibly expands its effective volume on exposure to steam or high temperature, or a bi- or multi-component fiber that reversibly bends in response to temperature, humidity, or other change in ambient conditions.

In some embodiments it can be desirable to include fibers in a layer that is coplanar with the adaptive fabric 100 in a flat configuration of the adaptive fabric 100, which can break up a dynamic cavity 250 that forms into two or more zones between layers 110. In some examples, fibers can be oriented in such a way where the fibers only run in a single direction (for example, warp or weft) or run in two directions (both warp and weft) and they may or may not cross over each other as in a weave. In further examples, fibers can be oriented to run in any suitable plurality of directions (e.g., three, four, five, six, or the like), or can be randomly disposed to run in a plurality of directions.

Turning to FIG. 3a, an adaptive fabric 100 similar to the adaptive fabric 100 shown in FIG. 2 is illustrated having a third layer 360 disposed between first and second layers 110A, 110B. In this example, the third layer 360 can comprise a contiguous planar sheet material that extends between layers 110A, 110B parallel to plane XY defined by axes X and Y. In various embodiments, the third layer 360 can comprise a non-dynamic material that remains substantially planar or non-lofted under at least the environmental conditions under which the first and second layers 110A, 110B loft as shown in FIG. 3a. The third layer 360 can comprise a sheet, thin film, membrane, nonwoven, batting, fabric, individual fibers or yarns, or any other material suitable for sub-dividing dynamic cavity 250.

However, in some embodiments, the third layer 360 can comprise a dynamic material. For example, the third layer 360 can have dynamic properties in response to environmental conditions which may or may not be the same as the first and/or second layer 110A, 110B. In examples where the third layer 360 responds to one or more of the same environmental conditions as the first and/or second layer 110A, 110B, the third layer 360 can respond with a condition range that is the same as the first and second layers 110A, 110B and/or outside a condition range of the first and second layers 110A, 110B.

In some embodiments, the third layer 360 can be coupled to one or both of the first and second layers 110A, 110B in any suitable way, including a seam, adhesive, weld, coupling structure, or the like. For example, in some embodiments, the third layer 360 can be coupled along one or more of the engaging portions 240 or other suitable locations. However, in further embodiments, the third layer 360 is not fixedly coupled at the engaging portions 240 and can simply be in contact with the one or both of the first and second layers 110A, 110B. In some embodiments, layer 360 can also be connected to layers 110A and 110B through weaving or knitting and the layers 360, 110A, and 110B, or a subset of the layers 360, 110A, and 110B can be produced together in the same process through weaving or knitting.

Turning to FIG. 3b, an adaptive fabric 100 similar to the adaptive fabric 100 shown in FIG. 3a is illustrated having a third layer 360 disposed between the first and second layers 110A, 110B and a plurality of additional layers 370 extending within the cavities 250. As shown in this example, the additional layers 370 are shown disposed parallel to the third layer 360 and coupled to respective internal portions 112A, 112B of the layers 110A, 110B within concave portions of the cavities 250 on opposing sides of the third layer 360.

In further embodiments, there can be a single additional layer 370 or any suitable plurality of additional layers 370 disposed between the first and second layers 110A, 110B within cavities 250 or other locations. Additionally, in further embodiments, one or more additional layers 370 can be disposed on external faces 111A, 111B of an adaptive fabric 100. For example, one or more additional layers 370 can extend between sides of a concave portion on one or both of the external faces 111A, 111B (e.g., first material portions 120A of the first layer 110A and/or second material portions 120B of the second layer 110B). Also, in some embodiments, one or more additional layers 370 can extend through one or both of the first and second layers 110A, 110B, although this is not shown in FIG. 3b.

While the example embodiment of FIG. 3b illustrates the third layer 360 and additional layers 370 being disposed in parallel, in further embodiments, the third layer 360 and one or more additional layers 370 may not be disposed in parallel. In various embodiments, one or more additional layers 370 can intersect each other and/or can intersect the third layer 360.

For example, FIG. 4a illustrates an example of an adaptive fabric 100 having a plurality of internal layers 480 extending within and between a pair of cavities 250 with the internal layers intersecting at junctions 481. As shown in this embodiment, one of the internal layers 480A can extend from an internal face 112A of a first cavity 250A, through an engaging portion 240 between the first and second layers 110A, 110B and into a second cavity 250B, where the internal layer 480A couples with an internal wall 112B of the second layer 110B within the second cavity 250B. Additionally, another one of the internal layers 480B can extend from an internal face 112A of the second cavity 250B, through the engaging portion 240 between the first and second layers 110A, 110B and into the first cavity 250A, where the internal layer 480B couples with an internal wall 112B of the second layer 110B within the first cavity 250A.

In some embodiments it can be desirable to include fibers that cross over from one active or responsive layer 110 to another, which can in some ways be similar to a spacer fabric. Loose, un-tensioned fibers or yarns can be used to span or connect two active layers 110 while substantially not restricting motion of the two layers 110. One example of a way to incorporate such loose fibers or yarns is to weave them into the structure with less tension than other yarns in the weave. The ability of the layers 110 to move in response to ambient change can be intentionally limited by the fibers or yarns crossing over from one layer to another, which can be used to prevent extreme geometric distortions in response to large environmental changes such as very cold temperatures.

For example, FIG. 4b, illustrates one embodiment where fibers 490 can extend within cavities 250 of an adaptive fabric 100. As shown in this example, a plurality of fibers 490 can extend between internal faces 112A, 112B of layers 110 with the cavities 250. The fibers 490 can extend at varying angles as shown in FIG. 4b, but in some embodiments, the fibers 490 can extend at regular angles, including some or all of the fiber 490 extending parallel to the X or Z axis. Additionally, in some embodiments, fibers 490 can extend between points on the same internal face 112 of the first and/or second layer 110A, 110B (e.g., within concave portions of the cavities) or between points of the same external face 111 of the first and/or second layer 110A, 110B (e.g., within concave portions of an external face 111A, 111B).

While the example of fibers 490 is used in FIG. 4b, in further embodiments, coils, ribbons, tubes, or other suitable structures can be used in alternative embodiments. Additionally, such structures can be elastic or inextensible along their length. In some embodiments it can be preferable to utilize fibers 490 or yarns with little stiffness so that they do not resist the motion of the adaptive textile 100. In addition to using thin fibers, it can also be desirable to use coiled yarns or fibers such as bi-component (or multicomponent) fibers that "self-crimp." Although coiled, these fibers in some examples do not necessarily have large environmental response to temperature or moisture or other environmental stimulus and can be distinct from the highly twisted actuating coils described, in some embodiments, as contributing to the environmental responsiveness of an adaptive fabric 100. While not contributing to the adaptive thickness in some examples, such coiled self-crimped fibers can be useful for their stretch and lack of mechanical stiffness inside the open cavity of the adaptive fabric 100. The lack of stiffness in such examples can allow for the relatively unimpeded motion of the adaptive fabric layers 110 that define the boundary of a cavity 250. In some embodiments it can be desirable for these fibers, structures, and materials disposed within cavities 250 to not be separated from each other by a distance much larger than 5 mm, or in other embodiments they may not be separated by a distance larger than 2 mm.

The introduction of fibers or filling materials into the dynamic cavities 250 of an adaptive fabric 100 can be accomplished in a number of suitable ways. One approach to breaking up a cavity 250 is to introduce a separate interstitial layer in the construction (e.g., a conventional or non-adaptive layer that is placed between two adaptive layers). The interstitial layer can be produced as a part of a multilayer textile production process but more simply can be inserted between two separate layers as the layers are assembled. Multiple cavities 250 can be produced during the textile production process. Fibers and yarns that span across two adaptive layers 110 can be placed in the textile during its production, for example, as a set of weft yarns. These fibers and yarns can also be stuffed into cavities 250 after the first production of the adaptive textile 100. A needle punching process can be used to entangle the fibers and to connect them with the adaptive fabric 100 through that entanglement. In some embodiments it is desirable to only apply the entanglement process in certain regions, and it may be further desirable to register the needles with structural features or zones within the adaptive fabric 100. Needles are not the only mechanism by which fiber entanglement can be realized, and any entanglement technique might be suitable to produce the desired structures, including water jet or hydroentanglement. Additionally, fibers, including those that are a part of a nonwoven scrim or batting, can be connected to environmentally responsive layers 110 through bonding through an adhesive, melting of a polymer, or physical intertwining where fibers or loops become mechanically wrapped or looped around a coil or hook in the material of the textile, such as with a hook and loop fastener, which is presented as a non-limiting example.

Although example illustrations herein show a symmetric cross section of a cavity 250 formed in an adaptive textile 250, further embodiments can be constructed in other suitable ways so that each layer 110 can respond to temperature differently given that temperature across the adaptive fabric 100 may not be uniform in some implementations. Each environmentally responsive layer 110 can have its own response, and in some embodiments, each layer 110 responds independent of the others. Each layer 110 need not have the same structural design and need not have the same response to temperature or other environmental factor. Accordingly, the example embodiments herein should not be construed to be limiting on the wide variety of implementations that are within the scope and spirit of the present disclosure.

Some adaptive textiles described herein and in related disclosures (e.g. in U.S. patent application Ser. No. 15/160,439, filed May 20, 2016) can include two layers or sheets paired together or, in some cases, two yarns or fibers paired together. In various examples, a linear dimensional change in one layer can force a bending distortion of one or both sheets of a pair of sheets. In some textile structures it can be desirable to minimize the amount of thermally responsive fiber or yarn, which can be achieved by employing the same types of structures while using smaller amounts of the active or thermally adaptive yarn. In one embodiment a fiber or yarn or ribbon that has a strong environmental response can be antagonistically arrayed with a number of fibers or yarns or ribbons, which in some embodiments may not require a large magnitude of thermal expansion coefficient and may be a low cost conventional fiber or yarn or ribbon, and the amount of material with a strong environmental response is substantially less than the amount of material paired with it. This can allow for the reduction in the overall mass of the adaptive structure and can allow for the reduced use of one or more of the materials in the adaptive structure. In some embodiments it can be desirable to minimize the amount of environmentally responsive yarn relative to conventional yarn while still maintaining a certain environmental response for the fabric. In some embodiments it can be advantageous to keep the amount of large-magnitude CTE material (1000 μm/m/K and larger) to 60% or less of the mass of the overall mass of the adaptive fabric. In some embodiments, it can be desirable to keep the amount of large-magnitude CTE material between 65%-35%, between 60%-40%, or between 55% and 45% of the overall mass of the adaptive fabric. In further embodiments it can be desirable to limit the amount of large-magnitude CTE material to 40% or less of the overall mass of the adaptive fabric. Large-magnitude CTE materials, such as twisted coiled polymer actuators, may cost more than conventional fiber and yarn materials in various examples, so using less of these more expensive materials can be of benefit. Additionally, mechanical and aesthetic properties, such as the stiffness and hand feel of the adaptive fabric, can be influenced by the identity and amount of various materials in the adaptive fabric structure, and in some cases it can be advantageous to reduce the amount of large-magnitude CTE material to address these non-thermal concerns. In some embodiments, by reducing the amount of large-magnitude CTE material in an adaptive textile structure there can be performance losses that have to be considered, such as a reduction in the overall thermal response of the fabric structure (change in effective thickness per ° C. change in temperature) or in the ability of the adaptive structure to resist flattening from external loads that could result from the use of the textile (for example, movement in a garment comprising adaptive fabric, or weight from a garment's construction, including elements such as zippers, snaps, non-adaptive fabric layers, seams, and the like). In one example, a woven adaptive fabric using a limited amount (40% of the total mass of the fabric) of large-magnitude CTE material (magnitude—3 mm/m/° C.) retained more than 80% of the temperature-responsive lofting performance of a fabric that had twice the amount of large-magnitude CTE material in it.

Figure 5A:
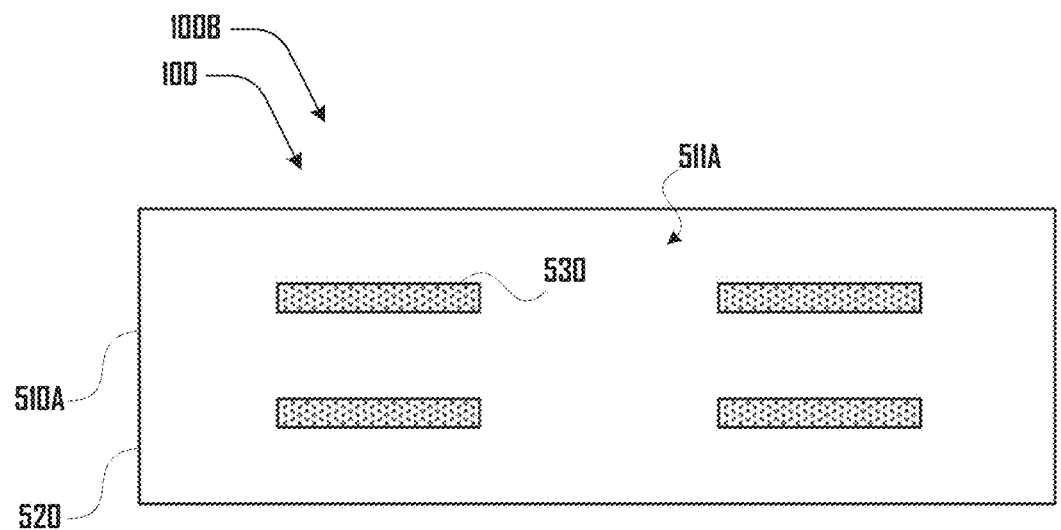
FIGS. 5a and 5b illustrate respective first and second faces of an alternating bimorph structure comprising a first and second material with different environmental response.
Figure 5B:
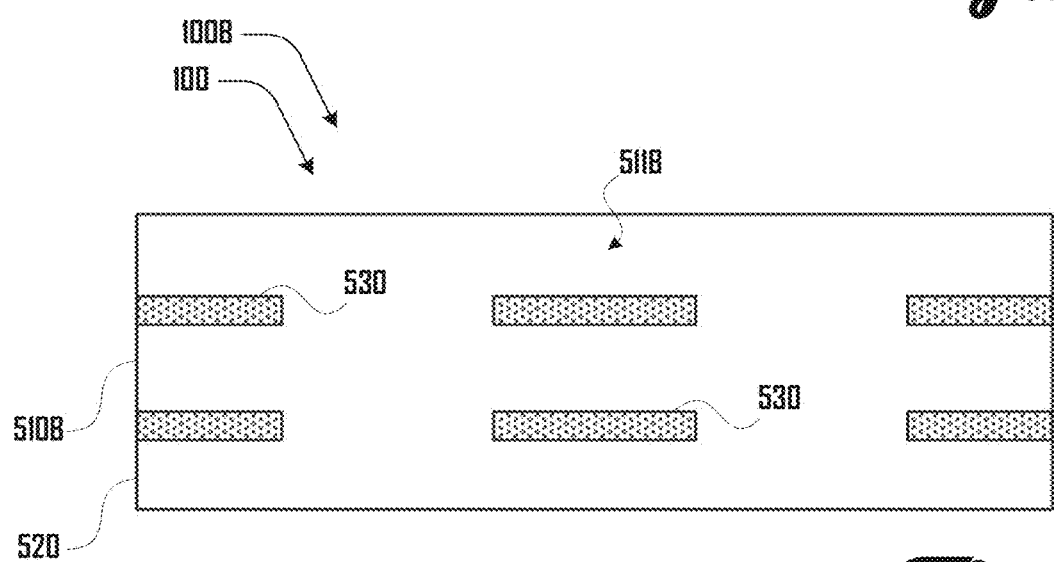

FIGS. 5a and 5b illustrate respective first and second faces 511A, 511B of an embodiment 100B of an alternating bimorph structure 100 comprising a first and second material 520, 530 with different environmental response (such as thermal expansion coefficient). The amount of the second material 530 is reduced compared to that of the first material 520, allowing for less use of the second material 520 and a smaller overall mass. Example FIGS. 5*a* and 5*b* show a structure 100B as made from two sheets 510A, 510B, with the second material 530 patterned or disposed on either side of the first and second sheets 510A, 510B. However, in further embodiments, similar structures can be created within textile structures, including knits, wovens, nonwovens, and the like. In some embodiments, the example portions of the second material 530 can be disposed on opposing sides of a single sheet 110. In other embodiments, second material 530 represents twisted polymer coil fiber or yarn actuators that are presented in different regions of the opposite faces of a bimorph structure as shown in FIG. 5*a* and FIG. 5*b*. It some examples it may be desirable to have the average spacing between twisted polymer coil actuators less than 50% of the average diameter of the actuators, but in other embodiments it may be desirable to utilize a smaller amount of the actuator and the average spacing between twisted polymer coil actuators could be 50% or more of the average diameter of the actuators, or 100% or more of the average diameter of the actuators.

In some embodiments it is desirable to reduce the overall density of a thermally adaptive textile 100. One approach is to minimize the thickness (and mass) of the yarns. In some knit or woven fabrics with low mass, yarns can have a diameter three to ten times that of the fibers in a nonwoven textile, which can be why the lowest density textiles are often nonwovens. Nonwoven textiles and textile materials can be used as a part of low-density adaptive textile structures. Independent of the type of textile, to realize a low density can require, in some examples, that the thermally responsive fibers or yarns be well-spaced in the fabric and minimally held together by the rest of the textile structure, thereby requiring a minimal amount (and mass) of material. However, spacing the fibers and yarns far from each other can provide space for the actuating fibers or yarns to move and shift in response to environmental changes; with a large space between actuating fibers and yarns, the actuating materials may not, in some examples, be constrained in their motion by their neighboring fibers or yarns. Additionally, in some embodiments, the exaggerated thermal response of a highly twisted or coiled fiber or yarn actuator can require the actuator to be constrained in some way so that the fiber or yarn does not primarily torsionally actuate. Linear actuation can translate into deflection in a desired perpendicular dimension if the actuating fiber or yarn is constrained so that it does not squirm (that is, in some examples, an extension in the X dimension can lead to a bending motion or displacement in the Z dimension if the fiber or yarn does not instead squirm in the Y dimension).

Nonwoven layers and constructions can provide appropriate constraint for actuating yarns and fibers. In one embodiment, a nonwoven scrim can be paired with an environmentally responsive yarn or fiber where the scrim provides constraint between actuating yarns or fibers (e.g., constraint in the Y dimension, to prevent unproductive lateral squirm) and can also serve as a material that is paired with the responsive fiber or yarn (e.g., providing a substrate for the thermally responsive fiber or yarn to work against as it linearly expands in the X dimension). Such a structure can be produced by weaving strips or ribbons of scrim with environmentally responsive fibers or yarns. Additionally, in some embodiments it can be advantageous to connect the environmentally responsive material to the nonwoven through thermal bonding, RF welding, an adhesive, stitch, or other fastener, bond, or other suitable structural element that serves to hold the scrim and yarn or fiber together in an appropriate way. In some embodiments it can be desirable to have such a connection be intermittent and not continuous along the path of contact between the constraining material (scrim or similar) and adaptive material (e.g., actuating yarn or fiber).

FIGS. 6*a* and 6*b* illustrate respective first and second faces 611A, 611B of an embodiment 100C of an alternating bimorph structure 100 comprising an environmentally responsive yarn 640 (or fiber or the like) and a constraining textile 620 such as a scrim, or the like, that has a different environmental response (such as thermal expansion coefficient) than the yarn 640. Linear change (e.g., expansion or contraction) in the actuating yarn 640 relative to scrim 620 can cause a bending of the alternating bimorph textile 100 and the responsive yarn 640 and scrim 620 that constitute the textile, leading to a change in the effective thickness of the textile structure 100.

Although some examples of a scrim or other suitable textile can comprise a coarse, strong fabric or gauze, a nonwoven scrim can be quite light, in some embodiments having a thickness of 75 μm, 50 μm, 25 μm, or less. Additionally, different scrims can have different amounts of stretch, bending stiffness, and other mechanical, thermal, and chemical properties. Furthermore, similar structures can be produced using any suitable textile including but not limited to knits, wovens, nonwoven fabrics and battings, membranes, and the like.

Nonwoven production techniques, such as a meltblown process, can be used to produce similar structures. For example, an array of environmentally responsive fibers or yarns can be passed under a stream or jet of fibers, which can be either periodically turned off, diverted, or blocked to mask the fibers so that the fibers create a pattern on one face of the responsive fibers or yarns. The process can be repeated inline or in a separate step on the other side of the actuating yarns or fibers, producing an alternating bimorph structure with low mass, which can be constrained in both X and Y dimensions by the nonwoven fiber sections. In some embodiments it is advantageous to register the patterns on each side of the actuating yarns or fibers. While the above describes a meltblown process, other nonwoven processes can be used as well, including spunbond, wet-laid processes, and the like.

Another approach to reducing the overall density of the responsive textile is to separate the actuating fibers or yarns in the Z dimension. With such a structure, the flat temperature can be controlled to be substantially out of the range of normal use so that under typical conditions the fabric structure possesses some undulating or lofted character, giving it a larger volume, and lower volumetric density, relative to its flat state. In such structures the textile can be expected to shift between lofted and very lofted states.

A standalone nonwoven batting with structural integrity can be used to fill in the dynamic pockets of an adaptive fabric. The batting can be added as a part of a multilayer textile production process, but more simply can be inserted between two separate layers as the layers are assembled. The fibers in the batting can be entangled with the adaptive fabric using a needle punching technique or other suitable method of entanglement. The batting can also be bonded to the adaptive fabric in select locations or the like. In some embodiments a connection between a nonwoven batting and an adaptive fabric ensures that any dynamically formed cavity in the fabric is effectively filled by the batting. The batting could also be of sufficiently low density or small fiber size to lack structural integrity and still find utility in filling space between two layers of a multilayer responsive textile. When connected to an adaptive fabric layer the batting can move with the fabric as it responds to changes in environmental conditions, filling some of the dynamically formed cavity space. With little structural integrity to stand on its own, a batting of various embodiments only minimally contributes to the overall thickness of the fabric construction, but it can contribute to the overall properties of the textile by partially filling the dynamic cavity space.

Control of the flat temperature can be achieved through materials selection as well as the production methods employed to produce the environmentally responsive fabric. Some environmentally responsive materials, such as highly twisted fiber actuators, can have two distinct regions of activity that can limit the range of motion of the fabric or control the flat temperature. As an example, a homochiral highly twisted coiled fiber actuator will respond to decreasing temperatures by expanding and increasing its length, and will respond to increasing temperatures by contracting and decreasing its length. This contraction is limited, though, as the temperature at which the coils come into contact with each other limits the contraction range. In a fabric, then, this type of actuator would impose a limit on the range of motion of the fabric in relation to temperature change, and above the coil-contact temperature the fabric would have only a limited response to temperature. This coil-contact temperature could be used to define an effective flat temperature for the textile, or a temperature at which the textile reaches a minimum thickness. Production methods can also be used to set the flat temperature of the textile. Stretching one materials section 120 or 130 relative to the other during production will change the flat temperature. After the production, as the stretch is released, the materials section will relax, inducing a bend in the paired segments where materials sections 120 and 130 are disposed opposite each other. A temperature change could then increase bending or decrease bending, and by inducing more or less bending in the structure during production the temperature at which the structure will reach a flat state will be impacted. In addition to stretch material sections 120 and 130 relative to each other, any other method of swelling, expanding, or contracting one materials section relative to the other can also be used to influence the flat temperature of the resulting textile. As a non-limiting example, exposing one materials section 120 or 130 to water, if water causes either a contraction or expansion of the materials section, can temporarily change its dimension during the production process, and upon drying the textile after production the textile will have a non-flat configuration, impacting its flat temperature. Similarly, environmental conditions during production can be varied, such as temperature or humidity, to influence or control the size of the materials section during production and thereby the loft in the resulting fabric at a different ambient temperature and the flat temperature of the fabric. Heat setting and calendering can also be used to control the flat temperature of the environmentally responsive fabric (see related U.S. patent application Ser. No. 15/160,439, filed May 20, 2016 (publication no. 2016/0340814)).

An environmentally adaptive fabric may combine a number of these strategies. As a non-limiting example, a fabric built on a combination of scrim and actuating yarn could also have a high flat temperature so that the volumetric density of the fabric is low under typical use conditions and could furthermore include inter-layer fibers or yarns to partially fill the cavity and increase the insulation value of the adaptive structure.

Response to humidity and moisture in the environment (or liquid and vapor forms of one or more other molecule or chemical in the environment) can depend upon a number of features of the textile structure and any actuating yarns or fibers in the textile. The humidity or moisture response of an actuating fiber or yarn in the structure can drive a response in the structure of the textile, just as is the case with other environmental changes such as temperature. The overall fabric response to moisture or humidity can be controlled in the production of the actuating yarn or fiber or can be controlled through the mixing of actuating yarns and fibers with different levels of moisture or humidity sensitivity. Such yarns can also have a different temperature response, or they could have a temperature response that is substantially similar so that mixing the two together only impacts textile moisture and humidity response, not temperature response.

Drying time and wicking can be important in some examples of an adaptive textile 100, and structural elements of an adaptive textile 100 can be employed or introduced to improve moisture management in service of comfort or some other desirable feature of the textile 100. In some embodiments it can be advantageous to leverage the structure of the textile 100 for wicking properties, as one or both of the undulating structures of various embodiments of an active textile 100 and any filling fibers spanning two or more layers of the textile can provide an opportunity to transport liquid from one side or face of the textile to the other. Fibers can be selected to enhance wicking across the adaptive layers, and/or they can also be selected to enhance moisture uptake and evaporation. Moisture wicking can happen along the filling fibers, along any conventional fibers or yarns in the structure of the responsive textile, or along the actuating fibers, and the structure and materials selected can serve to support such moisture transport.

FIG. 7 illustrates an example of an alternating bimorph structure 100 in a lofted configuration with open cavities 240 that increase the effective thickness of the structure 100. The bent structure itself can serve as a wicking path through the materials 120, 130 (yarns, ribbons, coils, or the like), any of which can be selected for enhanced wicking properties. Fibers or yarns 790 crossing over from a first interior face 112A of a cavity 240 to a second interior face 112B can also provide paths for wicking. Example wicking paths are shown in the example of FIG. 7 wicking fluid via the wicking fibers 790 from the second layer 110B toward the first layer 110A.

The use of one or more absorbing materials (e.g., natural materials like wool or cotton, or naturally derived materials like viscose, or synthetic materials) can also serve to manage the moisture and thermal environment of an adaptive fabric 100.

In some embodiments twisted coiled fiber or yarn actuators can be utilized for their relatively large response to environmental changes such as temperature and/or ambient humidity. When constrained, such fiber and yarn actuators can undergo a linear expansion or contraction, but if inadequately constrained, such actuators can be capable of torsional motion in some examples. In some embodiments this torsional motion may be undesirable and can be minimized or eliminated by either plying the actuating fiber or yarn or by utilizing paired S and Z twist fibers or yarns in the textile structure to create a balanced textile. Unplied, separate S and Z yarns can be advantageous in some examples in that they allow for the production of a thinner textile when compared to a textile using a plied yarn. In some embodiments paired S and Z yarns might be in lateral contact with each other in the textile structure or they might be separated by some distance, with such distances up to 50%, or 100%, or more of the average diameter of the individual yarns. In some embodiments torsion can be limited by fibers or yarns that sit between coils in the actuating fiber or yarn, constraining the torsional motion. Such constraining fibers or yarns, slotted between the coils of an environmentally responsive yarn, can also serve to constrain the actuating fibers or yarns within the structure to limit the amount of lateral shifting (e.g., in the Y dimension) or unproductive squirm (e.g., in the Y dimension) in an adaptive textile. In some embodiments torsion can be limited by wrapping fibers in the opposite direction as the twist in the core, where the core is the highly twisted coiled fiber or yarn (e.g., wrap an S-core with fibers twisted in the Z direction, or vice versa).

Adaptive fabrics 100 as discussed herein can have various suitable applications in apparel, bedding, drapes, insulation, and the like. For example, in some embodiments, apparel such as a coat, sweater, or the like, can comprise an adaptive fabric with a first layer 110A of the adaptive fabric configured to surround and face the body of a wearer and a second layer 110B configured to face the external environment of the wearer. Such a configuration can include a liner and/or outer face in which the adaptive fabric 100 can be disposed. In other embodiments only a single adaptive layer 110 may be used in a garment or other product, and in other embodiments more than two adaptive layers 110 may be used in garment or other product.

In various embodiments, apparel comprising adaptive fabric 100 can be configured to change configurations based on the body temperature of the wearer and/or the temperature of the external environment, which can include lofting or flattening to provide for increased or decreased insulation based on temperature. For example, where the environmental temperature is colder than a desired comfortable temperature for the immediate environment of a user (e.g., around 27° C.) an external and/or internal layer 110 of the adaptive fabric 100 can be configured to loft to provide improved insulation from the cold for the user, with a greater amount of loft and insulation at lower ambient temperatures. Alternatively, where the environmental temperature is warmer than is comfortable for a user, an external and/or internal layer of the adaptive fabric 100 can be configured to flatten to provide decreased insulation for the user. The desired flat temperature for an adaptive textile can depend upon the intended use. In some embodiments a flat temperature above skin temperature is desired, 36° C. or higher. In other embodiments a warm flat temperature is desired, 31° C. or higher. In still other embodiments, a moderate flat temperature is desired, 26° C. And in still other embodiments a cooler flat temperature is desired, 21° C. or 16° C. or colder for some applications. In some embodiments, an adaptive textile can change configuration from a flat configuration within a temperature range of 10-40° C., 15-35° C. or 20-30° C.

Additionally, the adaptive fabric 100 of apparel can be configured to wick moisture associated with the body of a user away from the body of the user. For example, where a user sweats while wearing apparel comprising adaptive fabric, the adaptive fabric can be configured to wick the sweat away from the body of the user and toward the external environment. For example, referring to FIG. 7, the second layer 110B can be proximate to the body of a user with the first layer 110A facing away from the user such that moisture can wick away from the user.

Additionally, the adaptive fabric of apparel or bedding can be configured to change configuration based on humidity associated with the body of a user and direct such humidity away from the body of the user. For example, where a user sweats while wearing apparel comprising adaptive fabric and generates humidity, the adaptive fabric can be configured to become more porous and/or flatten to allow such humidity to escape from within the apparel toward the outside of the apparel and away from the user.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A thermally adaptable insulating garment wearable by a user and configured to change between configurations based on at least one of body temperature of the user and temperature of an environment immediately external to the thermally adaptable insulating garment, the configurations including a lofting and flattening to provide for increased and decreased insulation provided by the thermally adaptable insulating garment based on the at least one of the body temperature of the user and the temperature of the environment immediately external to the thermally adaptable insulating garment, the thermally adaptable insulating garment comprising:

an adaptive material configured to assume a lofted configuration and a flat configuration in response to different temperatures, with the flat configuration occurring within a temperature range of 10-40° C., the adaptive material including:

an adaptive first textile layer including:

a plurality of twisted polymer coil actuators with a first thermal expansion coefficient with a magnitude of at least 1000 µm/m/K and an average spacing between twisted polymer coil actuators at least 100% of average diameter of the twisted polymer coil actuators, and a second material disposed adjacent to the twisted polymer coil actuators, the second material having a second thermal expansion coefficient that is different from the first thermal expansion coefficient;

a second textile layer disposed opposing the adaptive first textile layer;

a plurality of linear engaging portions between the adaptive first textile layer and second textile layer; and a plurality of elongated cavities defined by the first and second textile layers and respective adjacent pairs of the linear engaging portions, the plurality of elongated cavities generated while the adaptive material is at least in the lofted configuration, wherein the plurality of elongated cavities further comprise a plurality of additional layers extending within the plurality of elongated cavities and coupled to respective opposing sides of an internal face of a portion of the plurality of elongated cavities defined by the adaptive first textile layer.

2. The thermally adaptable insulating garment of claim 1, wherein the second textile layer comprises an adaptive second textile layer, the adaptive second textile layer including:

a second plurality of twisted polymer coil actuators with a third thermal expansion coefficient with a magnitude of at least 1000 µm/m/K and an average spacing between twisted polymer coil actuators at least 100% of the average diameter of the twisted polymer coil actuators, and a fourth material disposed adjacent to the twisted polymer coil actuators, the fourth material having a fourth thermal expansion coefficient that is different from the third thermal expansion coefficient, the twisted polymer coil actuators and fourth material configured to change from a planar configuration to non-planar curved configurations in response to a change in temperature to generate the lofted configuration.

3. The thermally adaptable insulating garment of claim 2, wherein the first and second adaptive textile layers are disposed in an opposing configuration with the first and second plurality of twisted polymer coil actuators, with the twisted polymer coil actuators of the adaptive first textile layer facing respective sections with the twisted polymer coil actuators of the second textile layer, a plurality of sections of the second material of the adaptive first textile layer facing respective sections of the fourth material of the second textile layer.

4. The thermally adaptable insulating garment of claim 1, wherein the plurality of elongated cavities further comprise a plurality of fibers disposed within the plurality of elongated cavities.

5. The thermally adaptable insulating garment of claim 4, wherein each of the plurality of fibers extend between and are coupled to opposing internal faces of the first and second textile layers.

6. A thermally adaptive material configured to change configuration in response to different temperatures, with a lofted configuration providing for increased insulation relative to a flatter configuration, the thermally adaptive material comprising:
an adaptive first textile layer including:
a plurality of twisted polymer coil actuators with a first thermal expansion coefficient with a magnitude of at least 1000 μm/m/K and an average spacing between twisted polymer coil actuators at least 50% of an average diameter of the twisted polymer coil actuators, and
a second material disposed adjacent to the twisted polymer coil actuators, the second material having a second thermal expansion coefficient that is different from the first thermal expansion coefficient;
a second textile layer disposed opposing the adaptive first textile layer;
a plurality of engaging portions between the adaptive first textile layer and second textile layer;
one or more cavities defined by the first and second textile layers and respective adjacent pairs of the engaging portions, the cavities generated while the thermally adaptive material is at least in the lofted configuration; and
a plurality of additional layers extending within the cavities and coupled to respective opposing sides of an internal face of a portion of the cavities defined by the adaptive first textile layer.

7. The thermally adaptive material of claim 6, wherein the thermally adaptive material assumes the flatter configuration within a temperature range of 10-40° C.

8. The thermally adaptive material of claim 6, wherein the adaptive first textile layer comprises:
a plurality of sections containing twisted polymer coil actuators, and a plurality of sections of the second material disposed adjacent to respective sections of the plurality of sections containing twisted polymer coil actuators.

9. The thermally adaptive material of claim 8, wherein the second textile layer comprises an adaptive second textile layer that includes:
a second plurality of twisted polymer coil actuators with a third thermal expansion coefficient with a magnitude of at least 1000 μm/m/K and an average spacing between twisted polymer coil actuators at least 100% of the average diameter of the twisted polymer coil actuators, and
a fourth material disposed adjacent to the twisted polymer coil actuators, the fourth material having a fourth thermal expansion coefficient that is different from the third thermal expansion coefficient, the twisted polymer coil actuators and fourth material configured to change from a planar configuration to non-planar curved configurations in response to a change in temperature to generate the lofted configuration.

10. The thermally adaptive material of claim 6, further comprising a plurality of fibers extending between opposing internal faces of the first and second textile layers.

11. The thermally adaptive material of claim 10, wherein the plurality of fibers extending between the opposing internal faces of the first and second textile layers within the cavities wick fluid associated with the body of a user away from the body of the user toward the external environment by wicking fluid from the second textile layer toward the adaptive first textile layer.

12. The thermally adaptive material of claim 6, wherein changing from the flatter configuration to the lofted configuration in response to different temperatures results in an increase of at least 100% in a thickness of the thermally adaptive material.

13. The thermally adaptive material of claim 6, wherein the first thermal expansion coefficient of the plurality of twisted polymer coil actuators is negative.

14. The thermally adaptive material of claim 6, wherein the second textile layer comprises an adaptive second textile layer and a first flat temperature of the adaptive first textile layer is configured to be different than a second flat temperature of the second textile layer.

15. The thermally adaptive material of claim 6, wherein the thermally adaptive material is configured to change configuration in response to different temperatures and different humidity levels.

16. The thermally adaptive material of claim 15, wherein the thermally adaptive material responds to an increase in humidity by changing configuration from the lofted configuration to the flatter configuration.

17. A thermally adaptive material configured to change configuration in response to different temperatures, with a lofted configuration providing for increased insulation relative a flatter configuration, the thermally adaptive material comprising:
an adaptive first textile layer including:
a plurality of twisted polymer coil actuators with a first thermal expansion coefficient with a magnitude of at least 1000 μm/m/K and an average spacing between twisted polymer coil actuators at least 100% of an average diameter of the twisted polymer coil actuators, and
a nonwoven layer with a second thermal expansion coefficient that is different from the first thermal expansion coefficient, wherein:

the nonwoven layer connects to the plurality of twisted polymer coil actuators, and sections of the twisted polymer coil actuators are disposed on both faces of the adaptive first textile layer;

a second textile layer disposed opposing the adaptive first textile layer;

a plurality of engaging portions between the adaptive first textile layer and second textile layer;

one or more cavities defined by the first and second textile layers and respective adjacent pairs of the engaging portions, the cavities generated while the thermally adaptive material is at least in the lofted configuration; and a plurality of additional layers extending within the cavities and coupled to respective opposing sides of an internal face of a portion of the cavities defined by the adaptive first textile layer.

* * * * *